ALVIN GUY VAN ALSTYNE
BURTON CUTLER
DONOVAN C. DAVIS
INVENTOR.

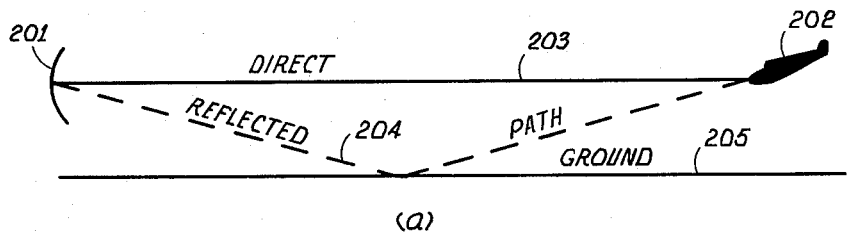
(a)
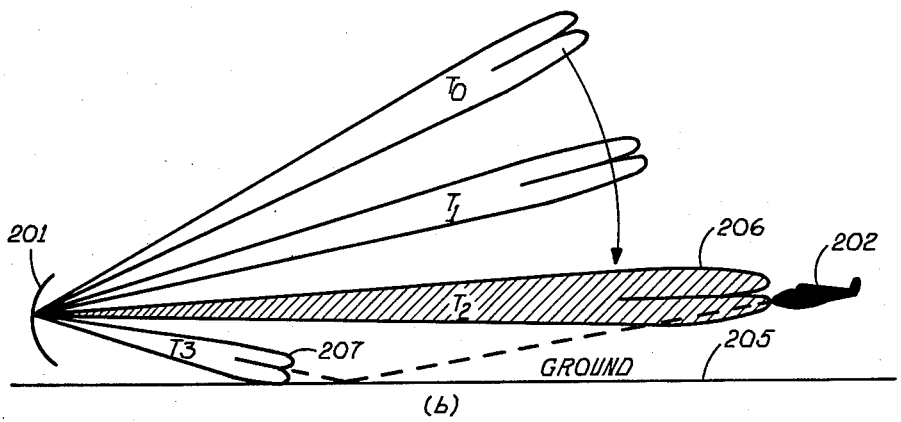
(b)
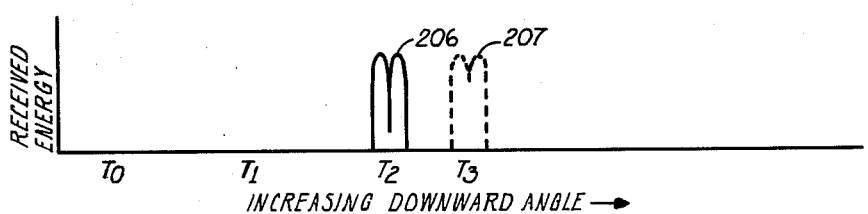
INCREASING DOWNWARD ANGLE →
(c)
FIG. 2

ALVIN GUY VAN ALSTYNE
BURTON CUTLER
DONOVAN C. DAVIS
INVENTOR.

BY William T. O'Neil

AGENT:

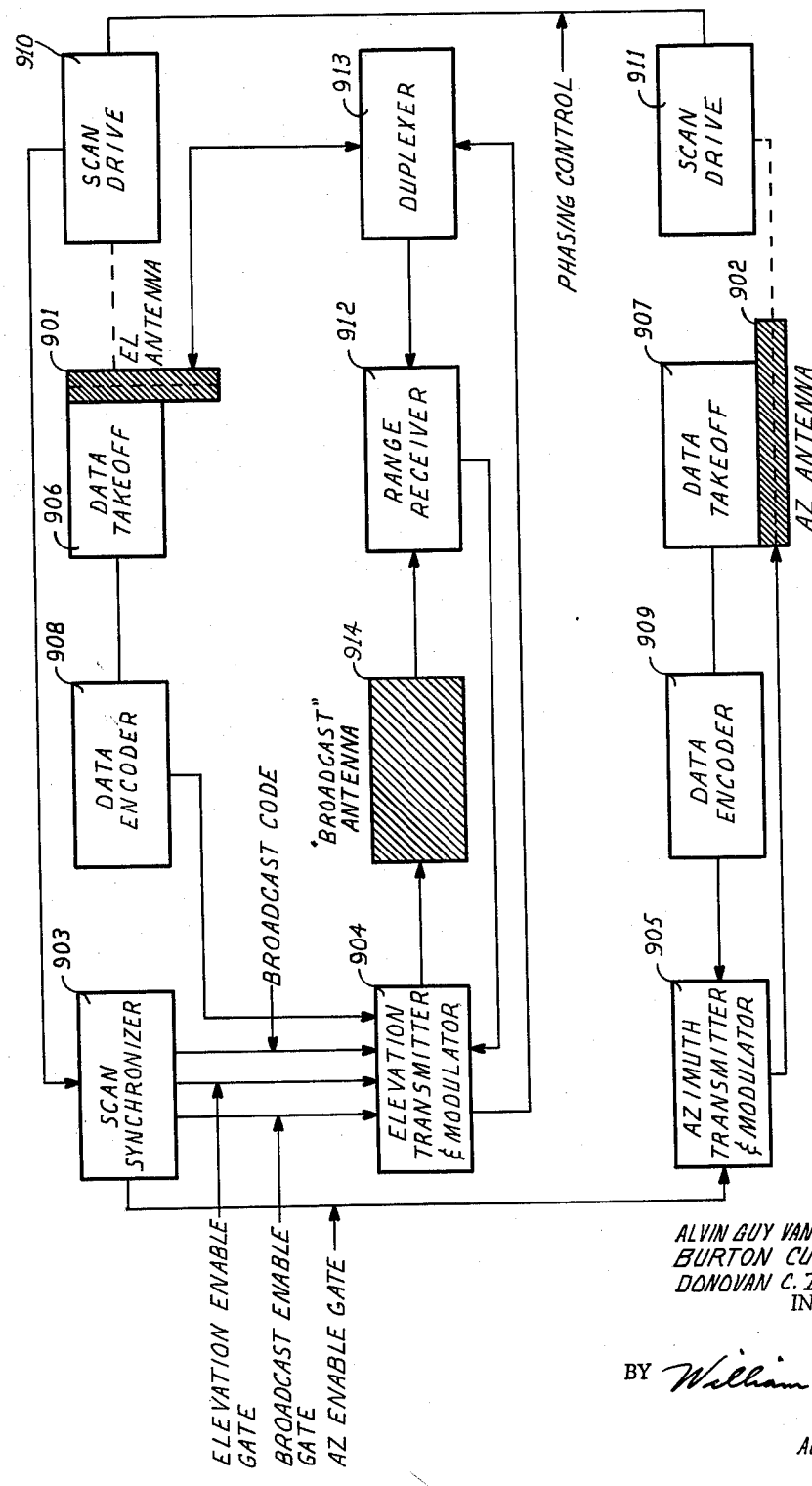

ALVIN GUY VAN ALSTYNE
BURTON CUTLER
DONOVAN C. DAVIS
INVENTORS

AGENT

ALVIN GUY VAN ALSTYNE
BURTON CUTLER
DONOVAN C. DAVIS
INVENTOR.

BY *William F. O'Neil*

AGENT:

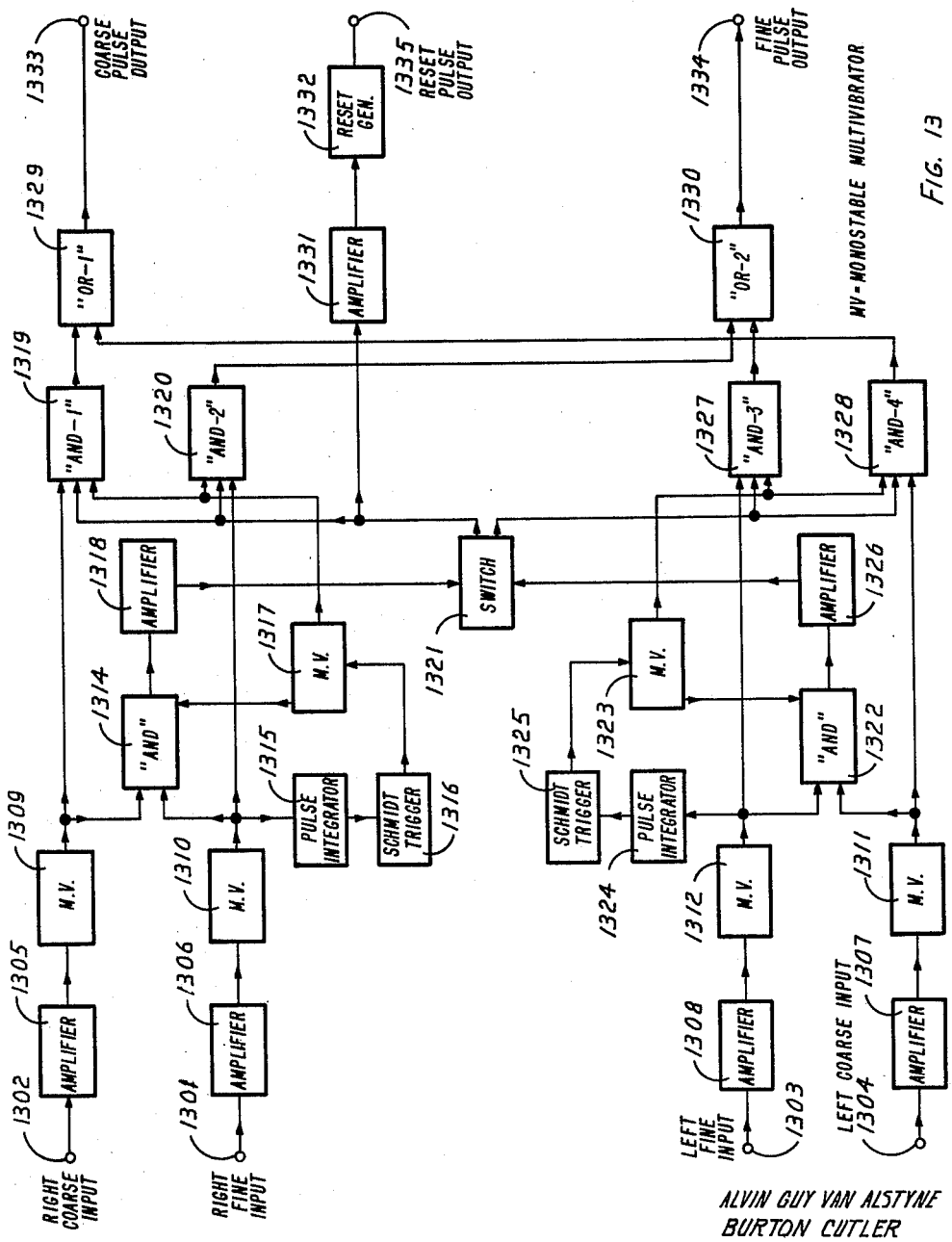

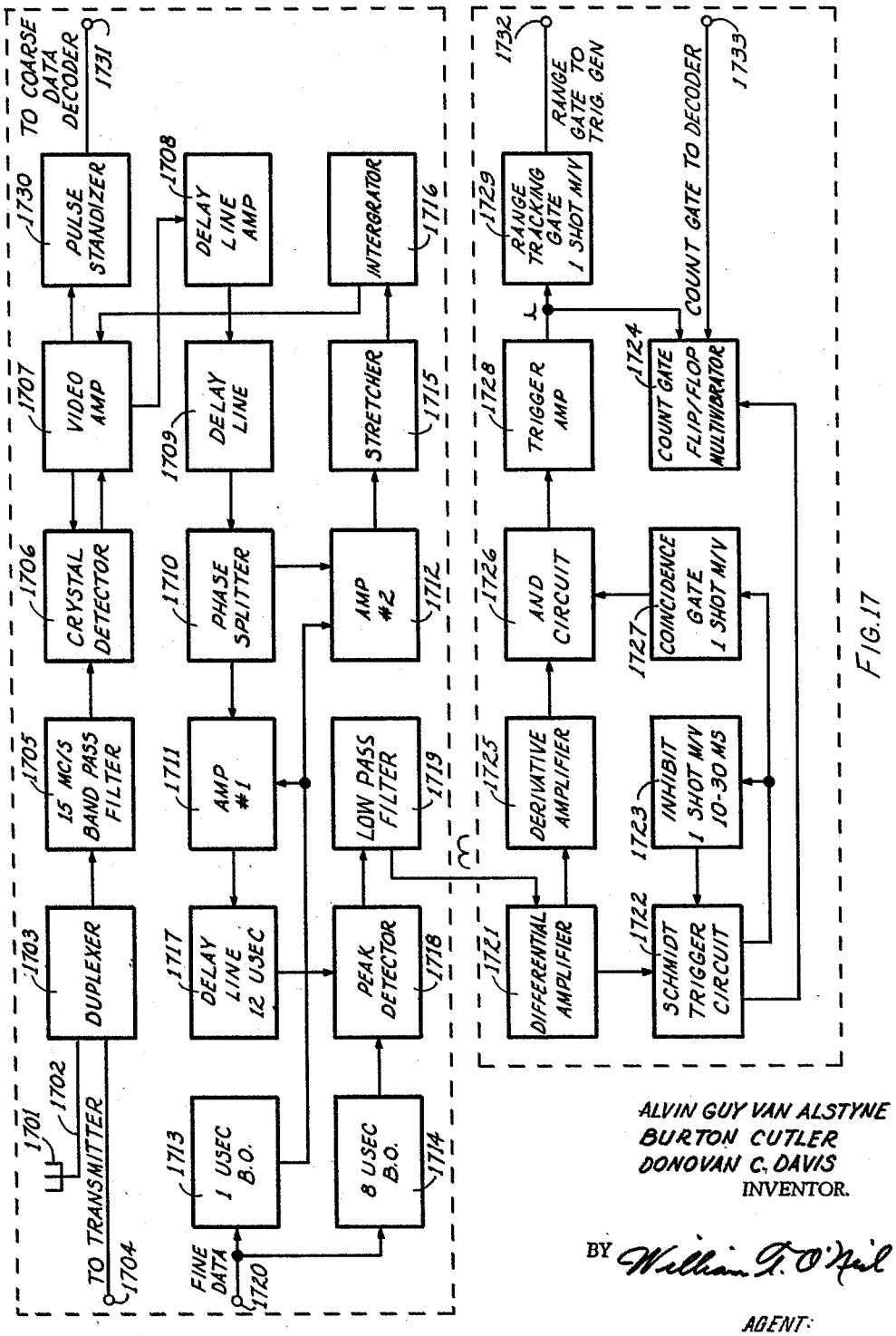

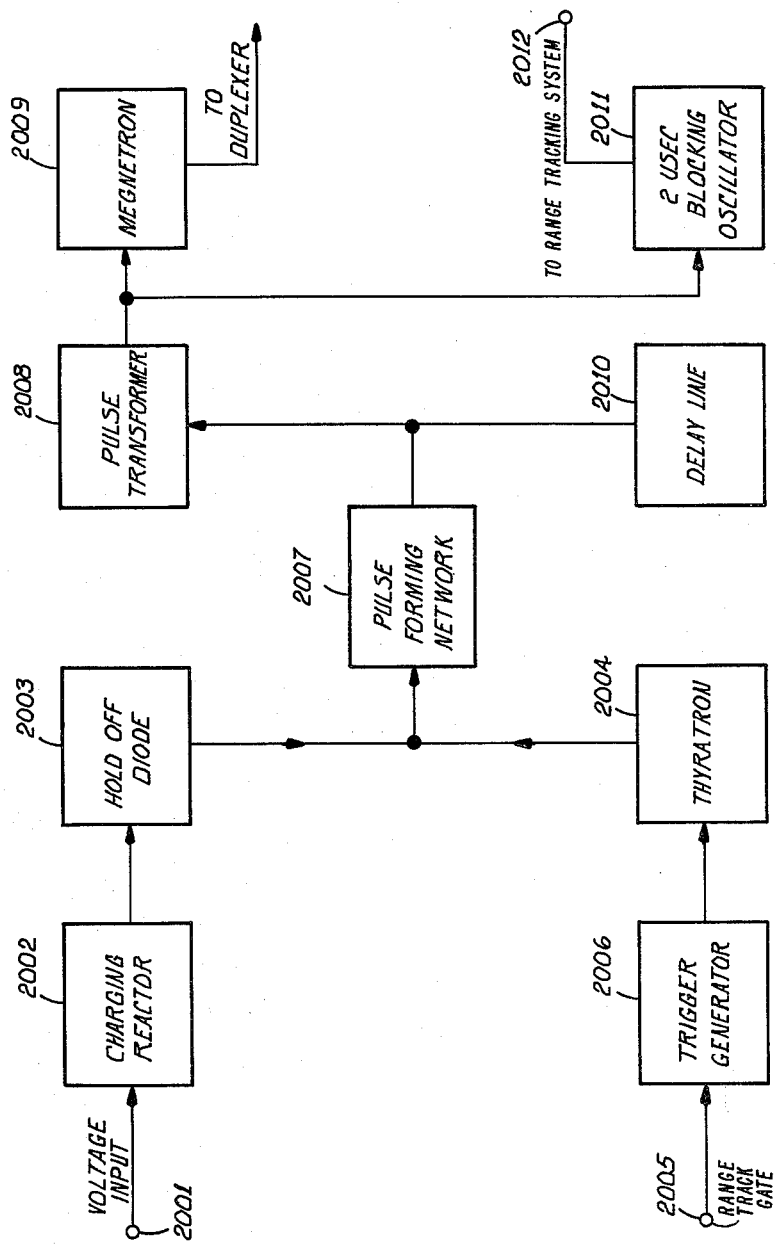

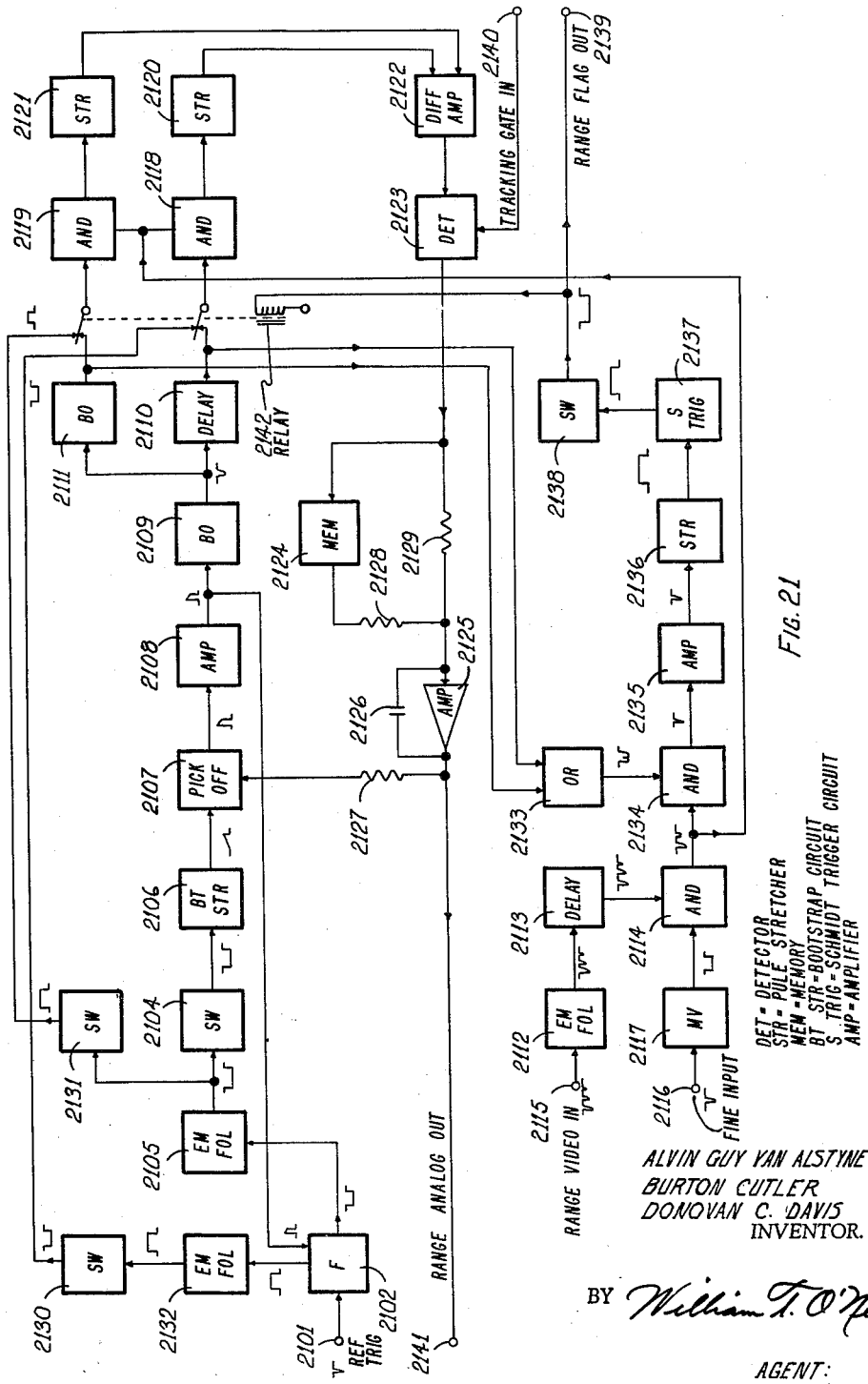

United States Patent Office 3,159,837
Patented Dec. 1, 1964

3,159,837
AUTOMATIC LANDING CONTROL SYSTEM USING SCANNING INTERFEROMETER BEAMS
Alvin Guy Van Alstyne, Burton Cutler, and Donovan C. Davis, Los Angeles, Calif., assignors, by mesne assignments, to ITT Gilfillan Inc., Los Angeles, Calif., a corporation of Delaware
Filed Mar. 15, 1960, Ser. No. 15,233
11 Claims. (Cl. 343—107)

This invention relates to an aircraft control system and more particularly to an aircraft system which, in the region enclosing the landing approach path of an aircraft, provides accurate position data for guidance to landing.

At present there are prior art "blind" approach systems as Ground Controlled Approach (GCA), Automatic Ground controlled Approach (AGCA) and Instrument Landing Systems (ILS). Such systems are capable of providing multiple aircraft guidance for low approach, but have insufficient accuracy or are otherwise inadequate for complete landings.

The above referred to GCA system is delineated in considerable detail in U.S. Patent No. 2,555,101, issued May 29, 1951. Considerable information relative to the AGCA system is contained in patent application S.N. 398,288, filed December 15, 1953, assigned to Gilfillan Bros. Inc., now Patent No. 2,980,902, entitled "Improvements in Automatic GCA Systems." A handbook entitled "Electronic Navigation," by Leonard W. Orman, published jointly in 1950 by the Pan American Navigation Service, 12021 Ventura Boulevard, North Hollywood, California, and Weems System of Navigation, Annapolis, Maryland, discussed the ILS system in Chapter VI, page 119. Additional information relative to GCA is also contained in the said handbook.

Data gathering systems based on electromagnetic radiation may be classified in terms of the number of one way trips negotiated by the radiated signals between the ground reference station and the aircraft. Thus, ILS may be said to be a one-way system, since the aircraft examines the ground system's radiation and determines its position directly. A two-way system may be imagined in which an airborne radar scans the terrain, and a determination of position is made by examining the energy reflected from ground objects. GCA and AGCA are three-way systems in which the ground radar system illuminates the aircraft, interprets the reflected energy, and then transmits the resulting intelligence to the aircraft via a data link system.

The primary advantages of one-way systems over that of the two- and three-way systems are superior simplicity and reliability of the overall system and freedom from effects of attenuation of radar return due to rain. Of almost equal importance is the freedom from scintillation and ground clutter, and almost complete independence of communicaiton and data telemetry equipment. Furthermore, in high-density landing operations, the primary function of both the pilot and ground controllers must be to monitor for safety and should not involve any unnecessary manipulations. If a fully automatic landing capability is required for mixed traffic such as single-engine aircraft, military and commercial jets, and large transports, it is not realistic to require different parameters to be set into ground equipments controlling these planes; the best place to "set in" an aircraft's characteristics for a phase of flight as critical as landing is within its own airframe. This implies a one-way system. From the operational standpoint, the pilot can thereby be directly provided with the data necessary to monitor the flight, thus the complex problems of ground-based aquisition, identification, and multiple aircraft communications are eliminated. Automatic final approach systems using ILS and GCA have been amply demonstrated, GCA and/or automatic ILS has become routinely operational in most major airports throughout the world. However, with the continued increase of aircraft traffic, both as to numbers and types of aircraft, in recent years, the required traffic handling capability is not realizable if all aircraft must share a common long final approach and glidepath as provided in GCA and ILS. Various aircraft must conform to their own characteristic speeds with little allowable variation, therefore, in order to prevent overtake of one aircraft by another on final approach, aircraft of various speeds must be separated laterally up to the final 30 seconds or one minute prior to touchdown. An ideal approach facility, in consideration of the above facts, should provide wide angle coverage and a multiplicity of curved approach paths, rather than a single straight path share by all aircraft.

The present inventon described herein provides an approach and landing system (ALS) capable of handling high-density traffic composed of aircraft ranging from slow propeller driven types to high performance jets. The system employs a ground reference equipment which radiates precision scanning microwave beams appropriately encoded with angle data. This data, of critical importance in elevation and necessary in azimuth, is simultaneously available to all aircraft in the approach air space and is of such character and accuracy as to ensure the measurement accuracy even in the immediate touchdown area.

The ground equipment may be thought of as effectively generating a precise "reference grid" in space from which any aircraft in the approach airspace can determine its position in respect to the runway. A complete ground equipment according to the present invention utilizes microwave antennas with narrow fan shaped beams which scan through azimuth and elevation planes. The transmitted energy is modulated with a precision pulse code which denotes the instantaneous angle of the beam null. Any aircraft equipped with an ALS received-decoder may read-out the value of the modulated angle data at the instant that the scanning beam null is pointing directly at the aircraft.

The chief difficulty which has retarded application of scanning-beam radar for low-angle position measurement has been the deterioration of angle information as a result of ground-reflected energy adding randomly to the directly-radiated energy when the target's angular height is approximately one beamwidth or less above the ground. The result of such ground-reflected energy is to severely distort the shape of the radiated beam and therefore defeat the familiar techniques of position measurement which are, variously, based on (1) measurement of the center of the area of received energy, (2) measurement of the angle of peak energy, or (3) measurement of the bisector of the beam "edges." The obvious remedy for the ground reflection problem would be the use of smaller beamwidths, but this approach results in a self-limiting process because, for a given frequency, a narrower beam requires a larger antenna aperture, which in turn, requires a proportionally greater minimum distance from the radiator in order to construct a well-defined beam. Stated otherwise, it is necessary to utilize the beam only at a range beyond the Fresnel zone in which the elemental phase fronts are assembled to define the beam. Within the distance required to complete assembly of these phase fronts (Fresnel zone) the source of radiated energy (antenna aperture) tends to be an area as contrasted to a point beyond the Fresnel zone. The result of the greater distance required is a proportional reduction in accuracy of measurement of a subtended height for equal angular accuracy.

The present invention introduces a unique and entirely new method, especially for height measurement by means of a scanning radar. This unique method employs two techniques which directly circumvent the fundamental difficulties described above, permitting accurate height measurement (1) at angles substantially less than a beam-width above the ground and (2) at distances substantially less than the nominal Fresnel distance limit. The techniques are: (1) The use of a sharp phase-interference null to mark the beam center. (2) The use of the downward direction of scan only.

In the present invention the azimuth and elevation position-determining system for aircraft landing utilizes a scanning-beam ground-reference source, while the airborne equipment demodulates the transmitted angle data at the instant when the center of the ground-antenna beam is pointed directly at the aircraft. The use of beam-center marking by means of a sharp interference null allows the airborne equipment to utilize a very simple system for determining the beam-center. The beam-center null may be very readily identified either (1) by means of a simple threshold circuit, or, (2) by differentiating the received signal amplitude envelope.

In a system which does not employ beam-center marking, the airborne equipment must establish the beam center by one of the three prior art methods, the disadvantages of which have been declared and will, hereinafter, be discussed more fully.

In the absence of the beam null, the airborne decoding process would entail reading the value of transmitted angle data modulation at the center of a beam known only inferentially or approximately, and the desired angle data would no longer be available at the time the beam-center determination had been completed.

One prior art technique noted above for obtaining the angle data at the center of the beam involves reading angle data at the two edges of the beam and taking the average value or "bisector" as the desired angle data. While this technique is workable in ideal free-space conditions, it requires the use of non-optimum beam-center determination by means of arbitrarily established beam edges, and moreover suffers inaccuracies in the low-angle ground-based case. Another old method of determining the angle of the beam center involves utilization of beamwidth information derived from the previous scan. This technique is obviously limited in its accuracy and data-rate capabilities. Although variations of the other known methods could be adapted to implement data readout at the beam-center, all would require considerable complexity in order to preserve high accuracy and negligible delay, and would be susceptible of error when the beam shape is distorted by ground reflections.

When a sharp null is used for beam-center marking, as in the present invention, the airborne receiver can very simply accumulate angle data plus any necessary interpolation signals before the beam-center null is received and then simply terminate data accumulation when the beam-center has been detected. The null width at a level 15 db below the peak of the beam will be typically less than the required accuracy of the system. In a practical embodiment of the instant invention, for example, the null width was found to be less than .05 degree at this level. The accuracy may be further improved by employing a form of interpolation, but in general the additional complexity may not be warranted because of the high fundamental accuracy of the present invention.

The use of beam-center marking in an elevation position-determining system according to the present invention for landing also extends the practical minimum usable elevation angle in the presence of ground reflections. This improvement is difficult to demonstrate theoretically because of the large number of variables involved in the general case which are difficult to appraise realistically. However, it has been shown in field tests of the technique, to be discussed and illustrated in this specification in succeeding paragraphs, that at angles above the ground plane less than a beam-width, the position of the null remains relatively undeviated even when the amplitude pattern is sufficiently distorted to preclude the use of any of the techniques based on beam shape. Further, the use of the null for beam-center marking makes practical the accurate determination of elevation angle at ranges substantially less than the Fresnel zone limit, i.e., at ranges where the amplitude pattern is considerably broader than the nominal far-field beamwidth. These are key discoveries in connection with the system of the present invention.

The use of only the downward scan results in arrival of any ground-reflected energy later in the scan cycle than the direct beam. This property greatly reduces the complexity (in the airborne unit) required to differentiate between the direct and reflected signals. A bi-directional scan, as used in many prior art systems, has some severe disadvantages: (1) The ground-reflected beam will alternately precede and then follow the desired direct beam. Since under many terrain conditions the ground-reflected beam will be almost equal in magnitude to the direct beam, and since in the presence of ground-reflection there will be some very definite amplitude scintillations, there is no reasonable method of distinguishing between direct and ground-reflected energy on the basis of signal strength. (2) There are many terrain conditions where the ground-reflected beam will be severely distorted so that it may appear to have multiple peaks. It, therefore, does not appear to be reasonable to distinguish between direct and ground-reflected beams on the basis of a pulse-counting process, even if the complexity of this approach were considered acceptable.

A third possible basis for differentiating between the direct and ground-reflected beams could be based on a known time between successive scans. In order to accomplish this method, a dual-channel time gate would be required because the only predictable time relationship is between successive upward scans and between successive downward scans. Employment of this technique in an operational system would impose severe scan-cycle timing accuracy requirements on all ground equipments.

A fourth possible technique for differentiating between the direct and ground-reflected beam in a system which employs bi-directional scanning could be based on position-data memory. In a system of this type it would be necessary to activate the beam-center determining circuitry immediately prior to the receipt of the direct-beam signals and to disengage the circuitry immediately following the direct beam. This requires comparison of the last previous angle measurement with the modulated angle data while the airborne receiver is receiving signals from the edge or skirt of the direct beam. The decision to engage the beam-center detection circuitry would then be made on the basis of a pre-set difference between the last angle measurement and the received angle data. The establishment of these limits becomes critical because too wide a limit would permit the beam-center detector to consider energy received from ground reflections and too narrow a limit would prevent the beam-center detector from seeing the complete envelope of received signals. The establishment of these limits would be also critical because they must be wide enough to permit a reasonable change in position between scans.

It should be pointed out that a bi-directional scanning system does not offer a 2-to-1 improvement in the basic rate data obtainable in the aircraft. If a sinusoidal or a sawtooth-shaped angular scan cycle is employed an aircraft will receive angle data at intervals of one-half of the total scan period only when it is approaching at approximately the mean scan angle of the ground equipment. In the touchdown region where the requirements for high data rate are most severe, the aircraft will be located near the limits of the antenna scan. The aircraft would therefore, receive an angle measurement twice in rapid succession and will then have to wait almost a full scan period before receiving any additional angle measurements.

Another disadvantage of the bi-directional scanning system is that any errors caused by inherent data delays manifest themselves as hysteresis in the data and can be balanced out only when direction-of-scan information is available.

The major detailed technical difficulties associated with utilizing a bi-directional scan are described above. Substantially all of these difficulties are eliminated when a uni-directional scan is employed in conjunction with beam-center marking, as in the present invention. The airborne equipment must merely identify the first half of the main lobe of the direct beam and recognize the null which defines the beam-center. Following beam-center detection, the airborne receiver disregards all other received data for a substantial portion of the scan cycle, insuring that no ground-reflected signals are admitted to the beam-center detector.

It is an object of the present invention to provide, in the region enclosing the path of an aircraft in a terminal area, means enabling one or more aircraft to determine accurate position data for guidance to facilitate accuracy of approach sufficient to effect a complete landing.

It is another object of the present invention to provide an aircraft landing system which is sufficiently flexible and accurate to provide all classes of aircraft with guidance during approach and landing.

It is another object of the present invention to provide an aircraft landing system whereby various parameters, such as glide slopes, can be selected within the airframe.

It is yet another object of the present invention to provide an aircraft landing system with sufficient accuracy and smooth control capabilities for automatic landing.

In describing the present invention, drawings are submitted, briefly described as follows:

FIGURE 2 illustrates the geometry of ground reflections and demonstrates graphically how multiple path reception is eliminated.

FIGURE 9 is a block diagram of the basic ground equipment required to provide one-way position data in elevation and azimuth in a system in which the azimuth and elevation antennas are widely separated as depicted in FIGURE 1.

FIGURE 13 is a block diagram of the ground system's antenna switch logic circuits used in switching the angle data information derived from each of the antennas of the dual antenna system depicted in FIGURE 10 to the encoder.

FIGURE 17 is a block diagram of the airborne receiver and null detector.

FIGURE 20 is a block diagram of the airborne modulator-transmitter used in integrating the ground equipment to derive range information.

FIGURE 21 is a block diagram of the range tracker.

Figure 1:
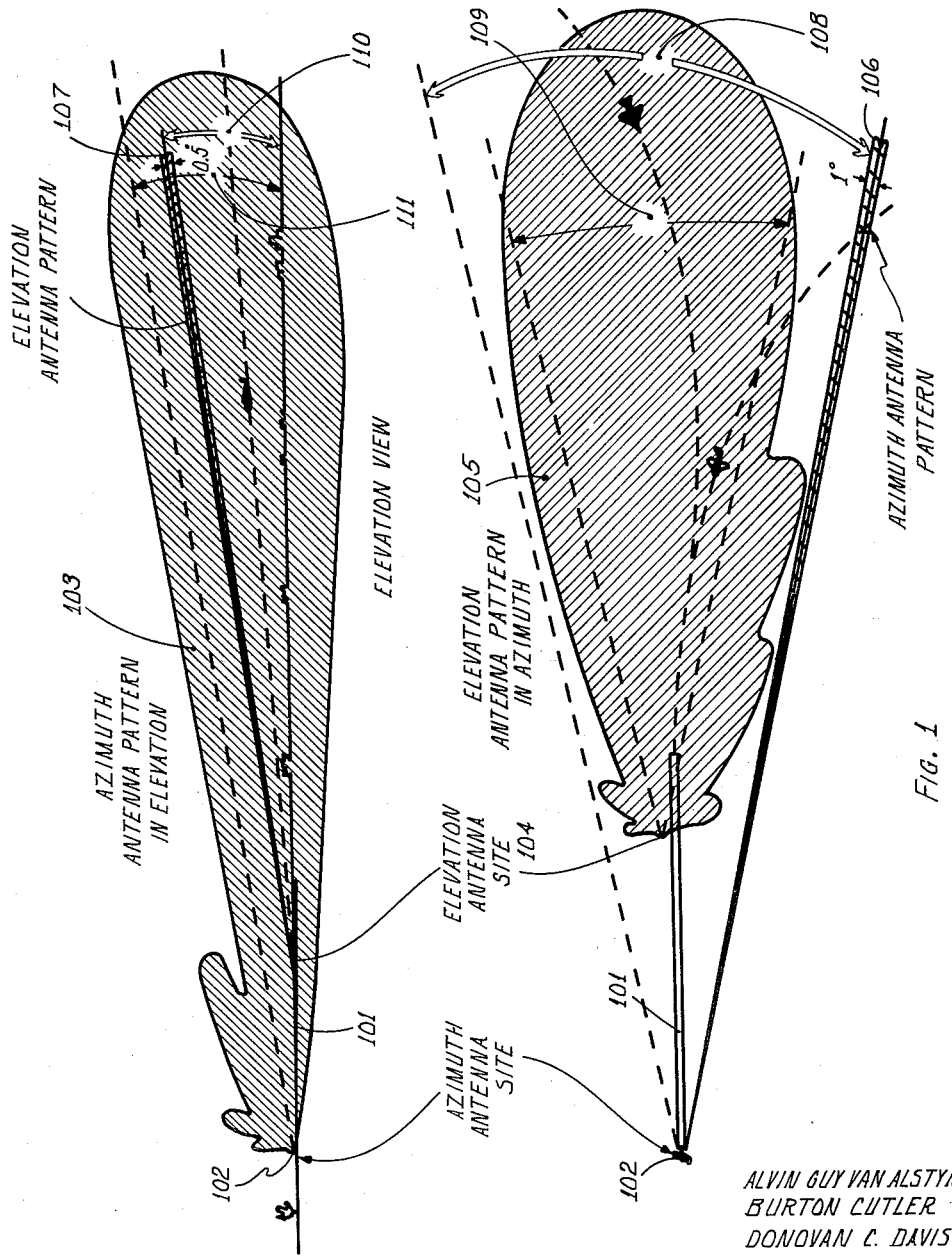
FIGURE 1 illustrates the beam angle coverage for the average runway in an average airport.

Referring now to FIGURE 1, runway 101 is typical of the average runway in the average airport. The azimuth antenna 102, located at the end of the runway, generates a beam which is narrow in azimuth and comparatively wide in elevation, sweeping horizontally so that the median sweep angle is approximately coincident with the runway center line. Beam 103 is typical of the vertical (elevation) pattern of the azimuth antenna. The elevation antenna 104 is located to one side of the runway substantially beside the touchdown point, and generates a beam which is narrow vertically (in the elevation plane) and comparatively wide horizontally. It sweeps vertically through a solid angle which is about equal to the elevation width of the azimuth beam. Elevation beam 105 is typical of the horizontal pattern of the elevation antenna. The said azimuth and elevation beams 103 and 105 respectively consist typically of pulse modulated radio energy. In the broadest sense of the present invention, the inventive concepts are also applicable to continuous wave implementation, however, the preferred embodiment herein described is a pulsed system. A distinguishing feature of both beams is a notch substantially in the center of the main lobe in the scan direction shown in FIGURE 1 as azimuth beam notch 106 and elevation beam notch 107. The notched beams are generated by interference between two illumination sources having mutually reciprocal RF phase, forming a microwave interferometer type source. The notch does not deviate significantly from its "boresite" angle when the antenna's instantaneous scan angle is close to the ground, whereas radio and radar beams of the conventional type are seriously distorted by ground reflections. As previously discussed, the sharpness of the notch in the beam also affords greater accuracy in position measurement than is available when the full width of the beam, several times that of the interference notch, is used to derive position information as in conventional radar. Therefore, one of the very important novelties of the automatic landing system of the present invention is the generation of a notched beam by interferometer technique, and the use of the notch with its relatively greater resolution and independence of ground reflection in elevation scanning, as the principal determinant of position. The azimuth and elevation antennas are most conveniently synchronized by a ground wire link using conventional techniques, such as synchro controlled servomechanisms to scan simultaneously and in fixed phase relationship, i.e., the azimuth antenna scans from left to right, whereas the elevation antenna scans from top to bottom of its limit. Each of the two antennas is mechanically driven through its scan cycle. The azimuth and elevation antennas are alternatively energized by their respective transmitters in any single scan cycle so that each antenna is always radiating during its sweep in one direction and is idle during its return sweep in the opposite direction. The preferred sequence causes the elevation antenna always to be illuminated during its down scan, but the direction of scan for the illuminated portion of the cycle of the azimuth antenna is arbitrarily selected.

In always scanning downward in elevation, the ground-reflected signals are not recognized by the airborne receiver, due to the time difference between receipt of energy from the direct and reflected path. When scanning downwards, the direct data will always be the first received. Abnormal terrain does not effect these geometrical relationships as illustrated in FIGURE 2. Since a very important objective of the present invention is to minimize airborne equipment complexity while rejecting ground reflections, it becomes apparent that the simplest procedure would be to scan down only so that the airborne equipment can readily eliminate ground reflection data on the basis of time. The geometry of ground reflections as illustrated in FIGURE 2 demonstrates graphically how multiple path reception can be eliminated by scanning down only and accepting only the first data received (corresponding to the highest angle). It will be noted in FIGURE 2(a, b, c) that the downward scanning antenna 201 points successively to lower angles (toward the groundline 205) in the sequence illustrated by $T_0$, $T_1$, $T_2$, $T_3$. The aircraft 202 will be illuminated when the beam 206 has reached the angle shown at time $T_2$ corresponding to path 203. Any false illumination representing erroneous angle data 207 must await a later time in the scan cycle, such as time $T_3$, whereby a reflected path 204 is possible. Therefore such erroneous data can be rejected by disregarding all signals, received later in the scan cycle than the first received signal, beam 206.

Referring to FIGURE 2(b), the airborne detection process is concluded immediately after receiving the first main beam energy at 206; energy received from beam position 207 is therefore not recognized due to the difference in time, as shown in FIGURE 2(c). The reflected beam 207 having arrived at the aircraft after the airborne detection process is concluded for the particular scan period.

The necessary functions of the ground system of the present invention comprise furnishing radiation which allows the aircraft to determine (1) the instantaneous angle of the beam which is radiating, (2) which of the two beams is radiating at any given time, and (3) the range of the aircraft from an arbitrary reference point which may be one of the two antennas, but is preferably a point on the runway where the "glidepath-parallel" intercepts the runway. (The "glidepath-parallel" is a plane parallel to the selected glidepath and passing through the elevation-scanning antenna.) Since angle data transmission from the ground is continuous during the active part of the scan cycle for both azimuth and elevation, continuous transmission of this angle data may be transmitted either (1) as modulation of the corresponding scanning beam or (2) modulated emission from a separate antenna, thereby producing a continuous stream of angle information available to all aircraft within the approach area. This modulation is preferably a train of pulses, digitally encoded to identify angles discretely and instantaneously with whatever angular resolution is desired with respect to the scan motion of whichever antenna is scanning. In the second of these methods, the aircraft determines the angle of the beam by counting the pulses radiated from the beginning of the scan until the beam notch (null) is received. Data may be provided as to which of the scanning beams is active by radiating a discrete code identifying the beginning of each scan. In a variation of the instrumentation of the invention, no such code from the reference antenna is required; since the information is conveyed in the form of a characteristic pulse rate for each of the scanning antennas, i.e., the incremental angle pulses radiated during the active scan of the elevation antenna occur at a multiple such as twice the frequency of those occurring during the azimuth antenna scan and are therefore easily recognized by the aircraft equipment as to respective significance. Information as to the range of the aircraft may be conveyed (1) by a reference (omnidirectional) antenna or (2) one of the scanning antennas, during the short time after beam-center detection when a portion of the antenna beam is still looking at the aircraft. Means of measuring range will hereinafter be disclosed.

After the null passes on each scan cycle, the aircraft emits a train of interrogation pulses which are received by a reference antenna or by the scanning antenna of the ground equipment, evoking reply pulses which are received by the aircraft. A range tracker in the aircraft determines distance by measuring the time delay of the received replies.

Figure 3:
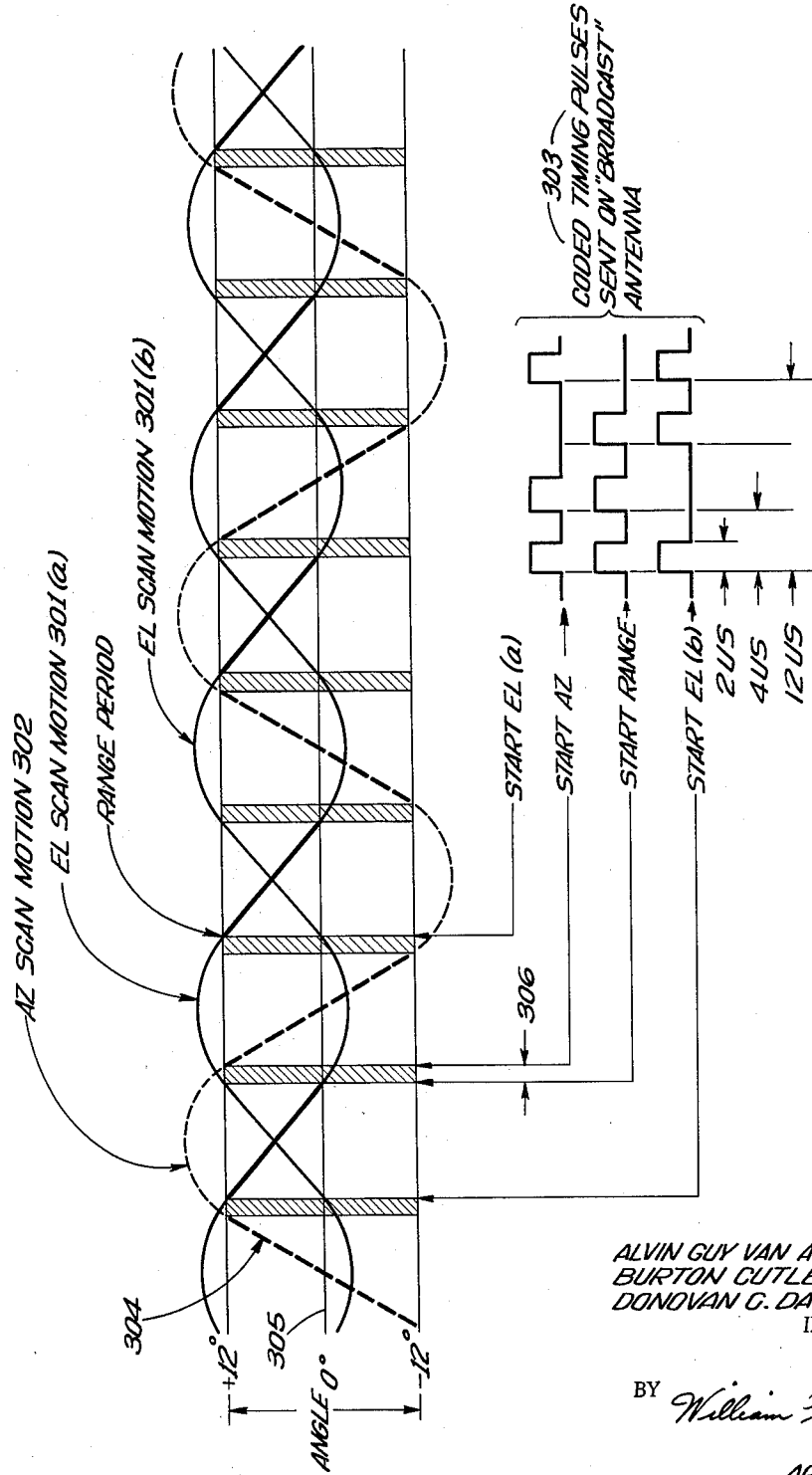
FIGURE 3 illustrates the time sequence of events for two scanning antennas and a reference antenna.

For the sake of illustration of the scanning relationships in an embodiment of the present invention having both azimuth and elevation scanning antennas and a separate reference antenna, FIGURE 3 is included. FIGURE 3 illustrates the time sequence of events for the two scanning antennas and the reference antenna. Since the reference antenna has a broad radiation pattern, it "announces" to all aircraft within a predetermined sector the status of data transmission (i.e., identifies the function transmitted at any time) as shown in FIGURE 3, by discrete code groups 303 at the start of each scan and range period. The complete elevation antenna scan motion and azimuth antenna scan motions are shown at 301(a), 301(b), and 302 respectively. The period of illumination of the elevation antenna during each complete scan motion is shown typically by the heavy solid portions of 301(a) and 301(b). The period of illumination of the azimuth antenna during each complete scan motion is typically shown by the heavy broken line 304. Zero degree line 305 represents the center of the runway 101 shown in FIGURE 1. Angles given as ordinates on FIGURE 3 apply to both scans and it can be seen that the azimuth beam scans both sides of the center line of the runway. As an example, the azimuth antenna complete scan illuminated angle is typically 24 degrees (i.e. ±12 degrees with respect to 305 or with respect to 205 on FIGURE 2).

It should be noted that the showing of two out-of-phase motions for elevation is for the purpose of insuring correspondence with the preferred elevation antenna, which will later be shown (FIGURE 10) to actually contain two alternately excited arrays scanned as shown in 301(a) and 301(b).

The elevation scan might typically be 12 degrees in this particular example, the ground line being zero. The time in which range measurement is accomplished is the interval of time represented by range period 306, as shown in FIGURE 3 neither the elevation nor the azimuth antenna being illuminated during this period. Aircraft originated interrogation pulses are received by the reference antenna and re-radiated to the aircraft. The ground system acts simply as a transponder in respect to range interrogations, and a range tracking circuit in the aircraft tracks the ground replies thus received.

The description of the invention hereafter will become more detailed, and accordingly, the discussion will be mostly limited to a version of the invention in which only elevation scan is employed, except for necessary occasional references to show the azimuth compatability of the broad concepts of the present invention. Fundamentally, the present invention is of most value in connection with elevation scan where it can provide height-above-ground data with the accuracy needed to effect aircraft landings. Existing landing guidance techniques for azimuth determination would be useful in conjunction therewith, since an error of a few feet or even as much as twenty or thirty feet in azimuth in the general aircraft landing problem is not of comparable significance with such an error in elevation.

Figure 4:
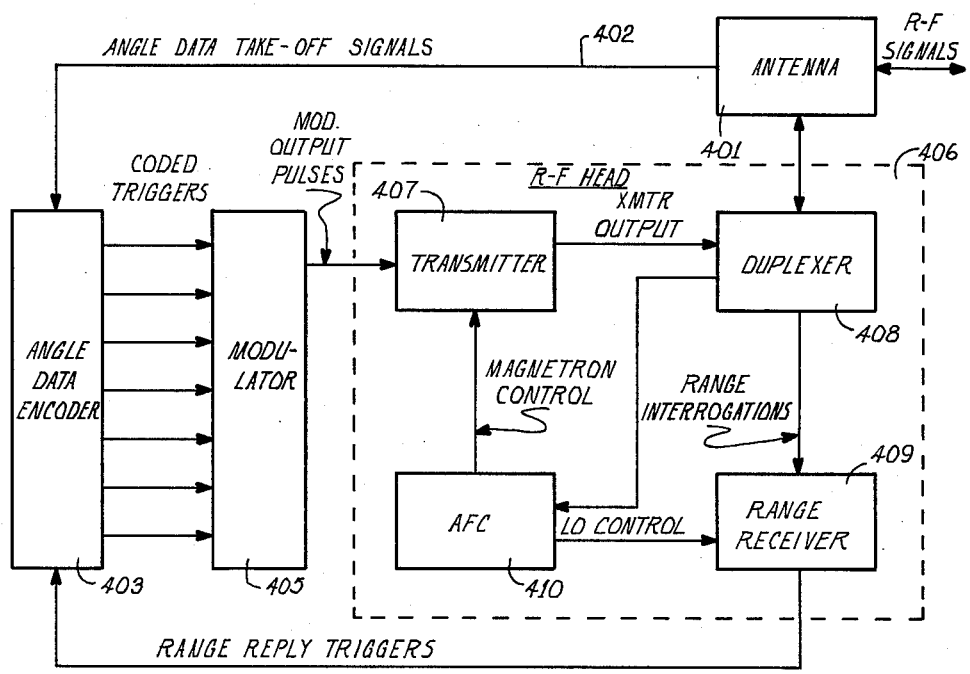
FIGURE 4 is a block diagram of the basic ground equipment comprising the elevation portion of the present invention.

Referring now to FIGURE 4, the basic ground equipment comprising the elevation portion of the present invention is shown.

It basically consists of an antenna system and angle data take-off (transducer) 401 with an elevation angle data output line 402, a data encoder 403, modulator 405, and a radio frequency (RF) section 406 containing a transmitter 407, duplexer 408, receiver 409, and an automatic frequency control (AFC) circuit 410.

The angle data signals on line 402 are fed to the angle data encoder 403 from the antenna data transducer. These signals are converted to coded trigger pulses by the angle data encoder 403 and are routed to the modulator 405. The modulator 405 shapes and amplifies these signals and delivers the output pulses to the transmitter 407. The transmitter output is transmitted through the duplexer 408 to the antenna.

The receiver 409 within the RF section 406 is of conventional design and receives aircraft range interrogation pulses through duplexer 408 which is the conventional T-R arrangement for opening and closing the receiver input path during receive and transmit intervals respectively. The received aircraft range interrogations are detected and amplified by receiver 409 and applied to the angle data encoder 403 wherein the range replies are retransmitted mingled in with the angle data transmission asynchronously.

AFC 410 operates in a conventional manner to stabilize the transmitter (magnetron) output frequency. AFC is important in the system since at least one type of scanning antenna adaptable to use in the system exhibits radiation angle inaccuracies if the frequency of the transmitted energy is permitted to vary.

The azimuth and elevation antennas are alike in that each has a single-plane interferometer type pattern. In the present invention, as shown in FIGURE 1, by way of example, the azimuth antenna is designed to have an overall nominal beamwidth of 1 degree in azimuth (notched beam 106) and a vertical beamwidth 111, of 12 degrees, and is scanned through a horizontal angle 108 of 24 degrees. The elevation antenna typically has a vertical beamwidth of 0.5 degree in elevation (notched beam 107) and a horizontal beamwidth 109 of approximately 24 degrees, and is scanned through a vertical angle 110 of 12 degrees.

Figure 5:
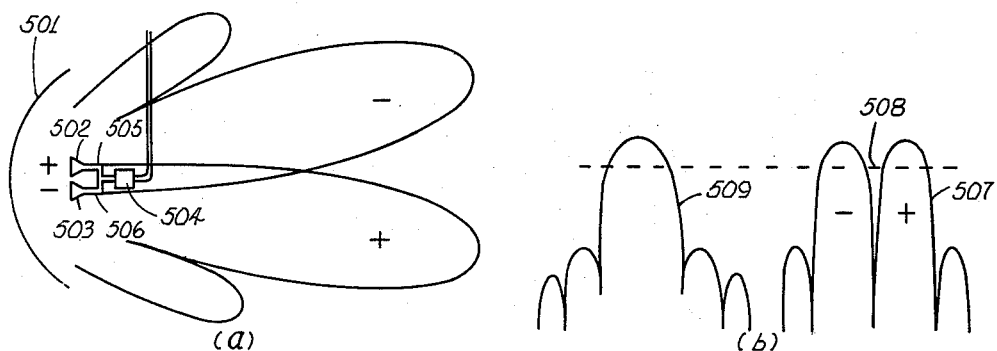
FIGURE 5(a) shows a dual horn single-plane monopulse antenna array, capable of radiating a difference pattern.
FIGURE 5(b) illustrates the comparison between a single-lobed antenna pattern and the double-lobed pattern utilized with the present invention.

Referring now to FIGURE 5(a), a suitable conventional single-plane monopulse (interferometer) antenna is illustrated, consisting of two horns illuminating a single reflector 501. The two horns 502 and 503 are fed through a hybrid junction 504 in order that the horns are fed out of phase. A lens substitute for reflector 501 could, of course, be used rather than a reflector in accordance with known antenna theory. It is of general interest to note that the angle at which the null of the resulting double-loded pattern occurs is coincident with the angle corresponding to the peak of the corresponding single-lobed pattern which would result from in-phase feed of the horns as shown in FIGURE 5(b) at 509.

Figure 6:
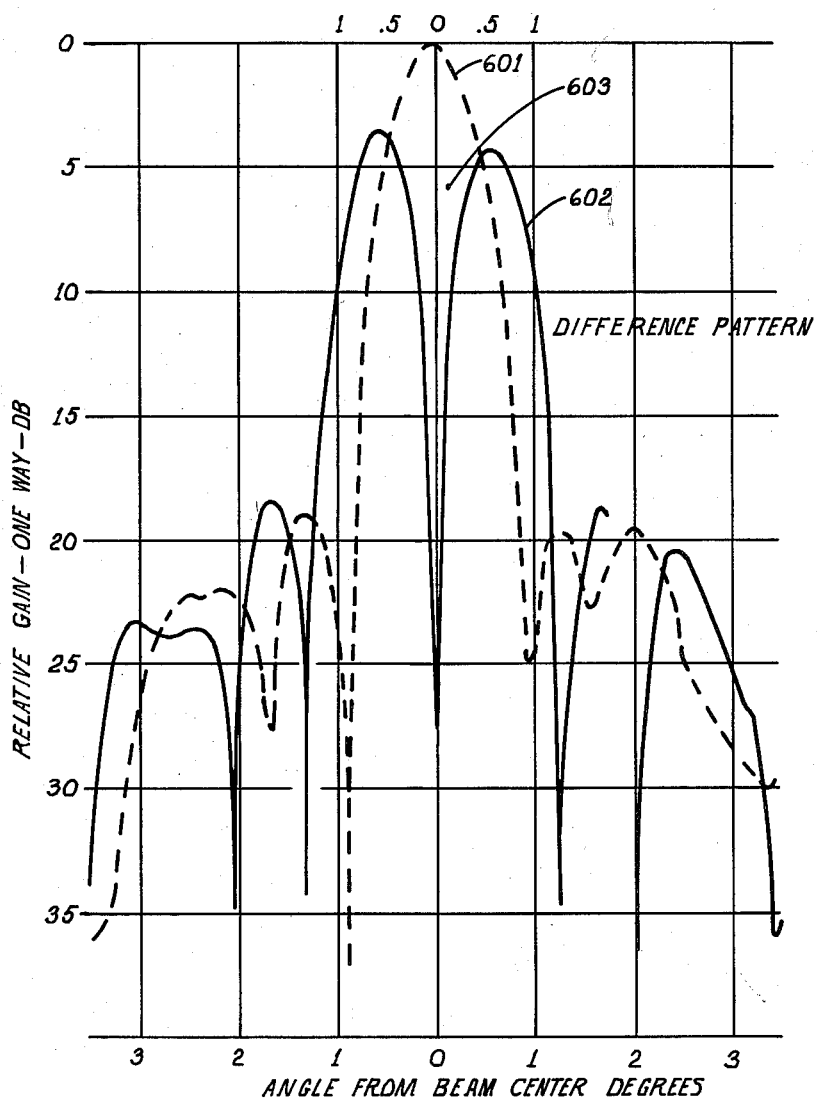
FIGURE 6 is a graph illustrating a typical difference pattern.

Since the energy received from the two feeds 505 and 506 are added out of phase, a "difference" (interferometer) pattern 507 will be obtained with a sharp null 508 identifying the center. In the ALS system of the present invention the two horns are fed out of phase so only the said difference pattern is radiated. This permits the beam center to be measured at a point where the slope is very high and the effective beam center corresponds to a very narrow angle. FIGURE 6 illustrates the one-way beam pattern of a successful embodiment of the above discussed antenna. The previously discussed sum and difference pattern and null desired from this type of antenna configuration in terms of realistic relative decibel gain levels is shown at 601, 602 and 603, respectively. The radiation of a notch-type pattern has been found to offer such extensive improvement as compared to the best prior art "pencil" beam techniques, the most salient of these advantages are listed by way of summarization as follows: The notched pattern (1) Accurately marks the beam center. (2) Effectively narrows the beam center by a factor of 3 or more. (3) Minimizes the requirement for a tight AGC threshold setting. (4) Permits measurements at a point of very high slope. (5) Improves the accuracy of measurements at close ranges within the Fresnel Region. (6) Is comparatively immune to beam center distortion due to multiple path effects.

The Fresnel Region is that volume in space, close to the antenna, in which the antenna aperture appears as an area rather than a point. In this region, the difference in distance between a point of observation and the center of the aperture on one hand and the point of observation and the edge of the aperture on the other hand is an appreciable part of a wavelength. Within the Fresnel Region (approximately 2,000 feet for a half-degree beam at X-band), the beam widens and distorts appreciably with decreasing range, increasing the problem of ground reflections. The notched pattern will also widen in the overall, but the relative improvement in center marking becomes relatively even more significant than at greater ranges.

Although the conventional two horn system described employs two horns illuminating a reflector it is functionally adequate for a system according to the present invention, the desirable aspect ratio of the beams of the orthogonal planes (12:1 for azimuth and 48:1 for elevation) is not compatible with illumination of a reflector from a point source feed such as horns. In order to satisfy the above requirements (the particular requirements imposed on the system of the present invention) in a more nearly optimum fashion, a linear array was used in the preferred instrumentation of the invention. The microwave linear array used in the present system is capable of radiating a very sharp beam of microwave energy which has a deep interference notch accurately centered between the beam edges at ranges as close as 400 feet.

Extensive verification tests were made using a 16-foot X-band (approximately 9,000 megacycles) linear array exhibiting a nominal sum pattern beamwidth of 0.45 degree. The antenna was constructed from two identical 8-foot antennas currently used in the U.S. Air Force Radar Set AN/CPN-4 (described in U.S. Patent No. 2,596,113) issued May 13, 1952 and entitled Bridge-Type Precision Antenna Structure. The two sections were fed from a hybrid to obtain 180-degree RF phase difference in the excitation of the said two sections, thus to obtain a difference pattern. The pattern illustrated in FIGURE 6 was actually derived from this antenna array. In actual use, accuracy was maintained at heights above the runway of only 5 or 6 feet. The maximum error at these heights was 8 inches at a range of 400 feet. These experimental tests are delineated in considerable detail in an article entitled "Regal—An Advanced Approach and Landing System" appearing in the IRE Transactions on Aeronautical and Navigational Electronics, volume ANE-6, Number 2, June 1959, published by The Institute of Radio Engineers, New York, New York. This article is incorporated by reference into this disclosure.

It will be understood that any antenna configuration capable of radiating a notched beam wherein the notch in the beam relative to angular position is approximately constant throughout its scan area fulfills the fundamental systems requirements and will serve quite satisfactorily as an integral part of the overall system of the present invention. Of course, the type of antenna system and the particular design employed will depend on the requirements of the system itself relative to beam coverage, range, etc., a typical general requirement being such as has been set forth by way of example in this specification. (In particular, an elevation antenna having a horizontal beamwidth of 24 degrees and a vertical beamwidth of 0.5 degree and an azimuth antenna having a vertical beamwidth of 12 degrees and a horizontal beamwidth of 1 degree.) Thus, the horizontal beamwidth of the elevation antenna covers the horizontal sector scanned by the azimuth antenna and the vertical beamwidth of the azimuth antenna covers the vertical sector scanned by the elevation antenna.

Figure 7:
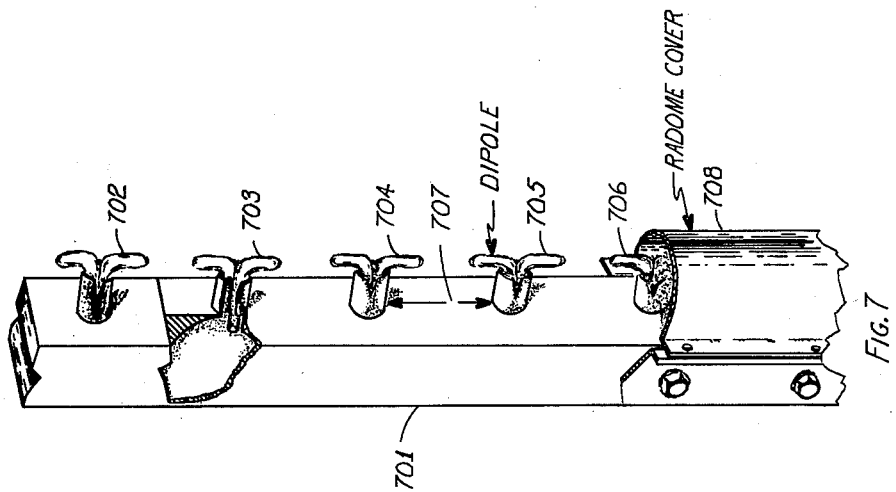
FIGURE 7 is a cutaway view of a section of a linear antenna array, using dipole radiating elements.

The linear antenna array configuration preferred in the present invention is shown in FIGURE 7. The linear array has the additional advantage of efficient utilization of size and weight. An additional advantage of the linear array is that it is amenable to inertialess scanning although in the present invention the antennas are mechanically scanned. This type of antenna comprises a transmission line 701 (waveguide) feeding a series of radiating elements 702 to 706 inclusive. The spacing 707 between successive dipole radiating elements is approximately one-half wavelength. The radome cover 708 simply protects the radiators from excessive dirt and moisture without materially influencing the antenna electrical characteristics.

A notched interference pattern (difference pattern) in this type of array could be obtained by feeding the array from one end with all radiating elements in one half of the array phase shifted 180 degrees from those in the other half. In the case of dipoles of the type shown in U.S. Patent No. 2,596,113, which derive their individual feed from waveguide 701 by means of a probe which is normal to the plane of any of said dipoles, this could consist of a simple 180-degree rotation of each dipole in one half of the array. This type of feed and dipole arrangement would result in two identical beams of opposite RF polarity being radiated in the same direction, resulting in cancellation at the center of the pattern. In the preferred configuration, i.e., a linear array center fed so that each half is energized in reciprocal phase relationship and the excitation energy traverses the two halves traveling in opposite directions just as in the previously discussed two horn antennas. Although the beam angle of each of the beams from said halves is sensitive to frequency and temperature changes, such changes are mutually compensatory (as a first order effect) as regards angle of the null. The AFC circuit 410, shown in FIGURE 4, acts to enhance the stability with regard to second order effects, it being desirable to eliminate second order effects due to frequency instabilities in a system as fundamentally accurate as the system of the present invention.

Figure 8:
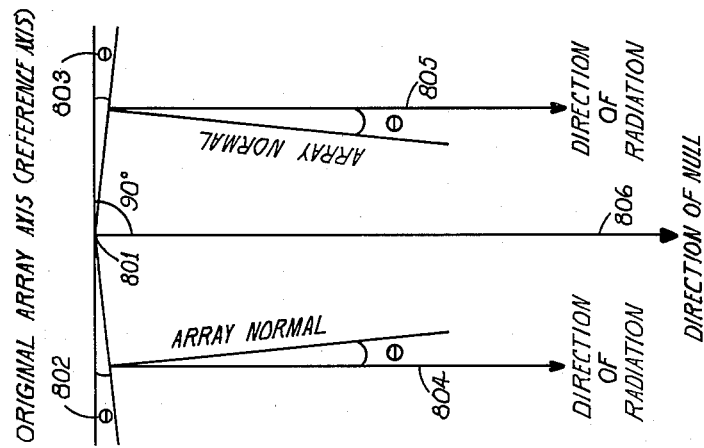
FIGURE 8 illustrates a method of avoiding deterioration of interference patterns in a non-resonant center-fed interferometer type linear array.

Certain disadvantages are connected with the operation of linear arrays at their resonant frequency, i.e., at that frequency which the radiation field propagates normal to the array axis (true broadside array). For this reason non-resonant operation is usually preferable for broadside linear arrays. In a center-fed interferometer type array as described above, however, uncompensated non-resonance will result in a deterioration of the interference patterns. This is prevented, as shown in FIGURE 8, by introducing a slight bend at the exact center of the array so that the axis 801 of the two halves of the array form a slight angle 802 and 803 in reference to the original array axis. If this angle is exactly equal to the radiation angle introduced by non-resonant operation of the array, the individual beams of the array halves will be exactly parallel, as shown at 804 and 805, resulting in a difference pattern of greater quality with the direction of the interference null 806 precisely normal to the original axis. To increase the frequency band over which satisfactory operation of the interferometer array is capable, the bend (axis 801) at the array feed point can be made adjustable, and calibrated for operation at given frequencies.

Additional theoretical information relative to the design of linear arrays and feeds is delineated in considerable detail in the textbook, Microwave Antenna Theory and Design, by Silver, volume 12 of the Radiation Laboratory Series, published in 1949 by the McGraw-Hill Book Company, Inc., New York, New York.

The various refinements discussed were introduced in order to minimize the effect of extraneous errors, and thereby to exploit the fundamental potential for accuracy of the present invention.

A simple scan technique using the linear array previously described is to mechanically rock each antenna back and forth through the elevation and azimuth scan sectors as is done with a number of nodding beam height finders. In addition to simplicity, this method offers the advantage of a directly linear function of beam angle with respect to the angular position of the antenna about the scan axis, thus facilitating a simple and accurate data takeoff. Of course, any number of antenna beam scanning techniques can be devised including the inertialess approach or the delta-A type scanner as described in U.S. Patent No. 2,596,113, that will move the antenna beam through a predetermined sector. The method, be it mechanical or electrical, is dependent on the type of antenna in conjunction with the overall engineering and environmental conditions to be considered in constructing such a system.

The reader is reminded that the azimuth and elevation sections of the ground equipment duplicate each other, i.e., FIGURE 4 shows only the one section of the complete ground system, and it can be either the azimuth or the elevation section.

When both the elevation and azimuth sections are integrated into a system whereby both elevation and azimuth information is available to the aircraft, a scan synchronizing system must be incorporated to insure a scanning sequence wherein the two sections share time. In other words, the azimuth transmitter is energized during the time the azimuth antenna is scanning the prescribed azimuth sector. The elevation transmitter is de-energized during this cycle of operation and the elevation antenna during this period is returned to a position whereby with this completion of the azimuth cycle of operation, the elevation starts to scan the prescribed elevation sector, the elevation transmitter being energized at the start of the said elevation scan.

Such a system of scan synchronization is prior art in itself, and delineated in considerable detail in the aforementioned issued patent, in particular U.S. Patent No. 2,555,101, issued May 29, 1951, entitled "Aircraft Control System."

In the above system of scan synchronization the separation between the azimuth and elevation antenna is relatively small. Therefore, one RF pulse generator (transmitter-modulator) is used to energize the antennas. This is accomplished by switching the output of the transmitter-modulator to the feed end of the antenna just before the start of the antennas' active cycle of scan. Thus, it is possible in such a system to gather elevation and azimuth information relative to the position of an aircraft with a single transmitter-modulator, due to the close proximity of the elevation and azimuth antenna. If the elevation and azimuth antennas are widely separated, the use of one transmitter-modulator becomes highly impractical at microwave frequencies due to the long RF feed system necessary to feed two widely separated antennas with a single transmitter-modulator. In the case of the present invention, the overall system comprising an elevation and azimuth section can, if required, be integrated in the same manner described in the above cited patent. Upon close study of the above referred system, it is obvious that two complete systems have been housed under one roof and that the main difference between the azimuth and elevation section is the beam pattern radiated by the individual antenna arrays and the position of the said arrays.

In the present invention, it has been suggested that the azimuth antenna be located at the far end of the runway and the elevation antenna be located near the runway touchdown point, as shown in FIGURE 1.

The ground equipment required to provide one-way position data in elevation and azimuth in a system that follows the suggested antenna placement, is shown in FIGURE 9. The elevation and azimuth antennas just discussed are shown at 901 and 902, respectively.

A motor-driven mechanical timing unit is used to perform the primary function of the Scan Synchronizer 903. Enabling signals are sent to the elevation and azimuth transmitter-modulator units 904 and 905 selectively, enabling data transmission from azimuth 902, elevation 901 and broadcast 914 antennas.

Angle signals are generated in the data takeoff units, elevation data takeoff 906 and azimuth data takeoff 907. Each of the two data takeoff units consists of a tone wheel (mechanical-to-electrical digital transducer) with coarse and fine serrations, two magnetic pickup heads and a dual-channel preamplifier. The position of the tone wheels geared to the antenna are indicative of angular position. An alternate pickup system consisting of photocells may be used instead of the magnetic pickup heads.

The magnetic pickup heads or the photocells, depending on which pickup system is in operation, generate pulses having a linear relationship to the angular position of the antenna. After the pulses are amplified, they are sent to the data encoder 908 and/or 909, to be time-spaced into codes. The coded pulses from the data encoder are amplified and shaped in the modulator. The modulator delivers corresponding power pulses to the magnetron. The RF output energy from the magnetron, in the elevation transmitter-modulator 904, is transmitted through the duplexer 913 to the elevation array. Range interrogation signals received from an aircraft are routed through the duplexer to the range receiver 912 for detection and amplification and are sent directly to the modulator 904 for retransmission since they require no encoding. The decoded range pulses are mixed with the angle data and are applied to the modulator and transmitter 904 to form a range reply.

The elevation and azimuth data takeoffs 906 and 907 and the data encoders 908 and 909 are of the same design, except for initial adjustments and calibration.

FIGURE 9 is a gross block diagram of an azimuth and elevation system.

The elevation and azimuth transmitter-modulator units 904 and 905 are very similar to previously designed X-band transmitters such as used in various countermeasures equipments which are pulse modulated by random pulse patterns.

The enabling gates which are sent to the transmitter-modulator units 904 and 905 from the Scan Synchronizer 903 actuate small ferrite RF switch assemblies to perform the RF switching among azimuth, elevation, and broadcast (reference) antennas. The elevation transmitter-modulator 904 output is thereby switched between the elevation and broadcast antennas 901 and 914 respectively, as a function of Scan Synchronizer 903 position. The broadcast code is radiated from the broadcast antenna at the beginning of each data interval, as shown in FIGURE 3; during the "Range" interval, the range receiver 912 is actuated and, upon receiving a range interrogation from aircraft, the receiver output, after video amplification, is used to pulse the elevation transmitter-modulator 904 to provide beacon transponder reply over the broadcast antenna 914.

Scan drives 910 and 911 drive the antennas in synchronous (phase locked) motion at a speed that provides an appropriate number of azimuth and elevation "looks" per second.

Figure 10:
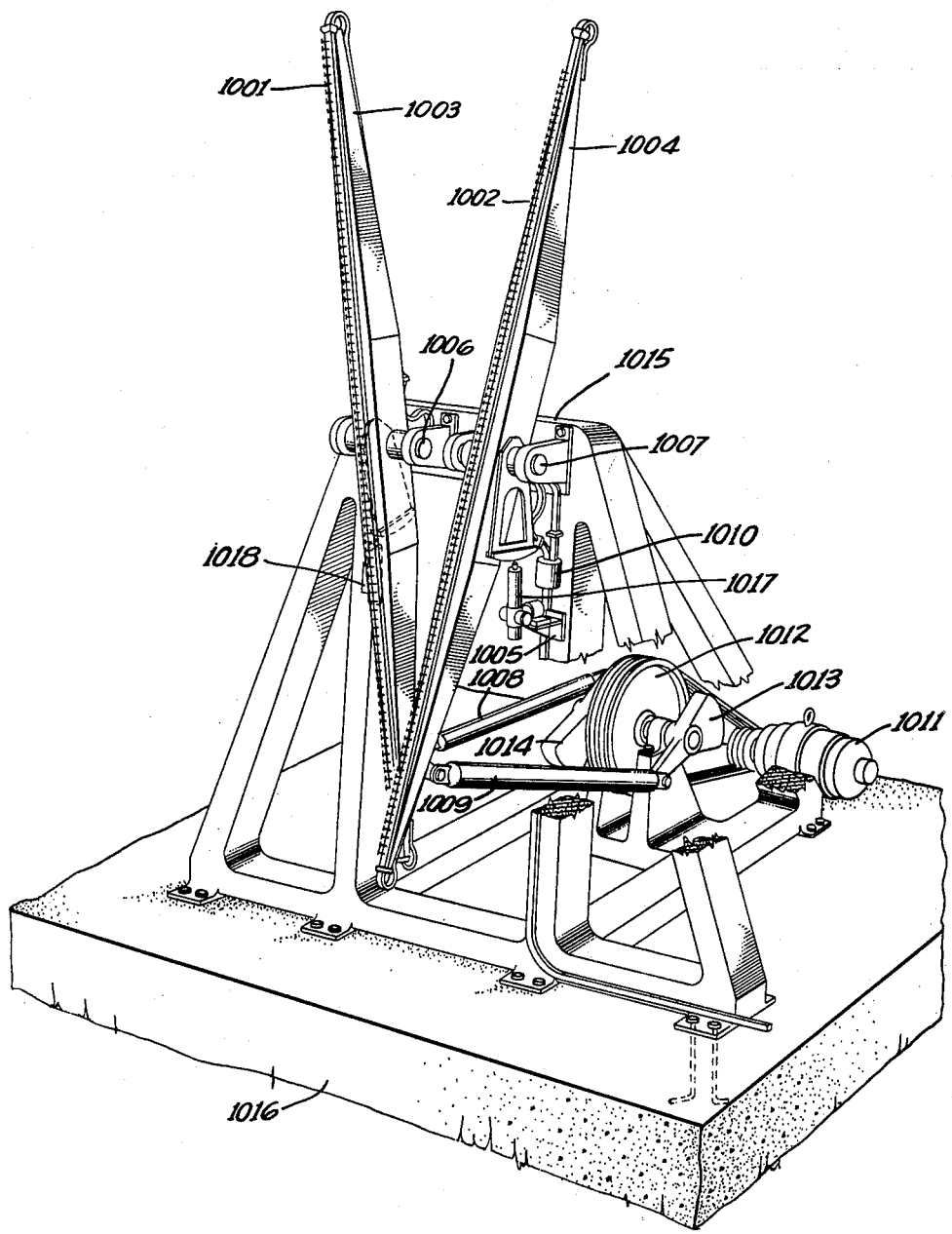
FIGURE 10 illustrates a dual antenna array which affords essentially twice the downward-scan duty cycle of a single array.

Considering again, the optimum "elevation alone" system, and since it is highly desirable to scan in the down direction only, it follows that the use of two vertical scanning arrays affords essentially twice the duty cycle of elevation scanning otherwise available. Such an arrangement wherein the two antennas are reciprocally driven is shown in FIGURE 10. Each array may have a scan rate of 2½ cycles per second or more within reasonable mechanical instrumentation. The RF energy from the transmitter via waveguide 1005 is coupled to an antenna selector switch 1010 of the ferrite type. This switch applies the transmitted RF energy alternately to the two antenna arrays through rotary RF joints located adjacent to bearing points 1006 and 1007. The transmitter output is switched to each array in succession just before the array starts moving downward, producing a beam which scans downward only.

The arrays 1001 and 1002 are each mounted on a light but rigid, tapered fabricated beam 1003 and 1004, thus making the rotating inertia as low as possible and reducing the amount of energy needed for acceleration as the beam is scanned in a mechanically sinusoidal fashion from a counterweighted bell crank arrangement comprising 1013 and 1009 for one antenna and 1014 and 1008 for the other. The tapered beam 1003, 1004 structure is designed to resonate mechanically at a frequency above 50 cycles per second. The pivot at the center includes preloaded Timken bearings at 1006 and 1007 holding bearing play to a minimum, thereby providing stable data takeoff points. As indicated on FIGURE 10, the two eccentrics are 180 degrees out of phase mechanically. The V-belt pulley 1012 and motor 1011 drive are of conventional design. The 20 degree scan angle of the antenna represents a 90 degree sector of rotation on the eccentric during its maximum travel, occurring typically in about 120 milliseconds. The antenna support assembly 1015 serves the obvious purpose of providing a rigid overall support over a rigid concrete base 1016. Azimuth arrays, if two are used, are positioned horizontally instead of the vertical position shown in FIGURE 10, the general mechanical requirement otherwise being the same.

Since the azimuth and elevation data takeoff units 906 and 907 are similar, only the elevation data takeoff will be discussed in more detail. The elevation data takeoff must be capable of providing either binary elevation data or pulses which can be encoded into binary words indicative of the actual elevation angle. As an example, ten binary bits are required to provide a resolution of 0.02 degree over a 20 degree scan. To avoid sending all ten bits at each increment of 0.02 degree, a coarse-fine system is used where a precision data word is used for each coarse mark. This information can be derived in a number of ways. A standard digital shaft encoder could be used. Another method is the use of an incremental encoder. Still another means would be the use of a magnetic drum. A tone wheel could also be used.

The standard commercially available digital shaft encoders provide not only required resolution, but also encoding. An encoder of suitable accuracy and gear ratio can be selected to provide the exact data required for a coarse-fine system. A brush-type encoder could be used but because of the short life expectancy when rotating at the speeds required, it is not regarded as a good solution to the requirement. The photoelectric type can provide adequate life only when the duty cycle is kept below a specified maximum.

An incremental encoder would be inscribed with the binary code. The incremental encoder requires indexing to mark initial and terminal angles, direction of rotation sense, and an electronic encoder to provide the precision data code. The indexing and direction sense can be provided by a separate data takeoff device, and the fine data counts can be encoded with quite simple circuitry. Like the standard digital encoders, the incremental encoder has the advantage of being readily available as a purchased item.

A magnetic drum with non-contact heads is capable of reading out the coded data as a function of antenna angle. A 3 inch diameter drum can be purchased with a very precise clock channel. The clock channel can then be used as the fine data by gearing the drum to the antenna to provide a clock pulse every 0.02 degree. The clock pulses can initially be used to write the binary data words (precision data) directly on six additional channels of the magnetic drum. An eighth channel could be added as a parity check.

Each of the above devices is applicable for deriving antenna angle information, and are available from manufacturers specializing in such "shaft motion" encoding devices. Librascope, Inc., 808 Western Avenue, Glendale, California, is an example of such a manufacturer. Other manufacturers capable of supplying the above items are listed in the "Electronic Enginner Master," a catalog of electronic manufacturers published in 1959 by Tech Publishers Inc., 60 Madison Avenue, Hempstead, New York.

In the present invention a "tone wheel" was selected for deriving beam angle data and is offered as one example of instrumentation of that function. In the magnetic system, two data take-off units are located at the pivot positions of the two elevation antenna arrays. Each of these units utilizes a 10 inch diameter engraved tone wheel, containing coarse and fine information, coupled to its respective antenna shaft through a 10:1 gear ratio, thus 20 degrees of scan sector is converted to 200 degrees on the tone wheel. The following measurements in degrees and mils are approximate values: One thousand and twenty four fine increments, each increment equivalent to 0.02 degree of antenna rotation, are spaced 17 mils apart with a groove depth of 7 mils on the tone wheel. Sixty four coarse increments, each increment equivalent to 0.32 degree of antenna rotation, are spaced 255 mils apart with a groove depth of 7 mils on the tone wheel. Each tone wheel uses two magnetic proximity pick-up heads, one for coarse data pick-up, and one for fine data pick-up. The exposed pole pieces on the four pick-up heads are ground to within ± .005 inch of their specified dimension, enabling the pick-up heads to develop pulses which respond to the rate of change of flux resulting from the movement of the serrated face of the tone wheel with respect to the exposed pole pieces of the pick-up heads. If the antenna speed in the 20 degree sector varies from 2.0 to 3.4 radius per second, the corresponding fine frequency variations from the pick-up heads range from 9750 c.p.s. (cycles per second) to 5735.3 c.p.s. The coarse frequency equals 1/16 of the fine frequency. Also, on each of the tone wheels, are "turn-around" indentations, whose pulses are used by the encoder to determine which antenna is in the downward scan. Pulse information from the data take-off units is amplified by a dual-channel preamplifier located on the antenna mount. The output pulses are then delivered to the encoder.

Figure 12:
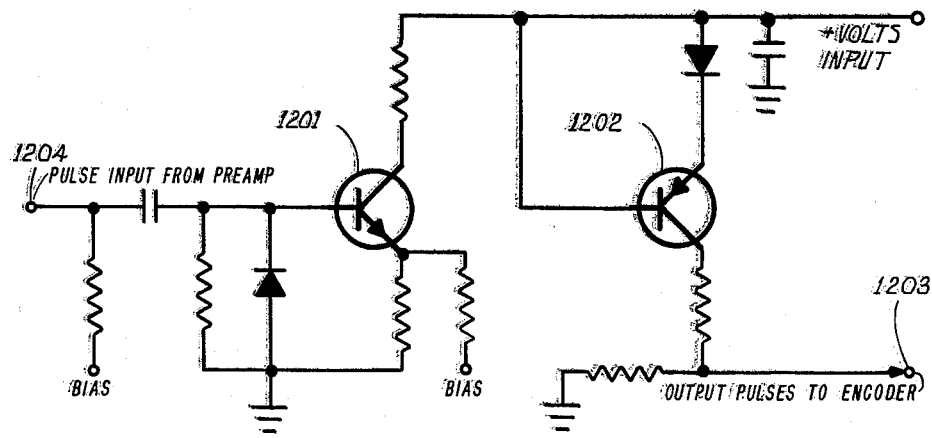
FIGURE 12 is a schematic diagram of a typical pulse shaper used to shape the output of the optical data preamplifier.
Figure 11:
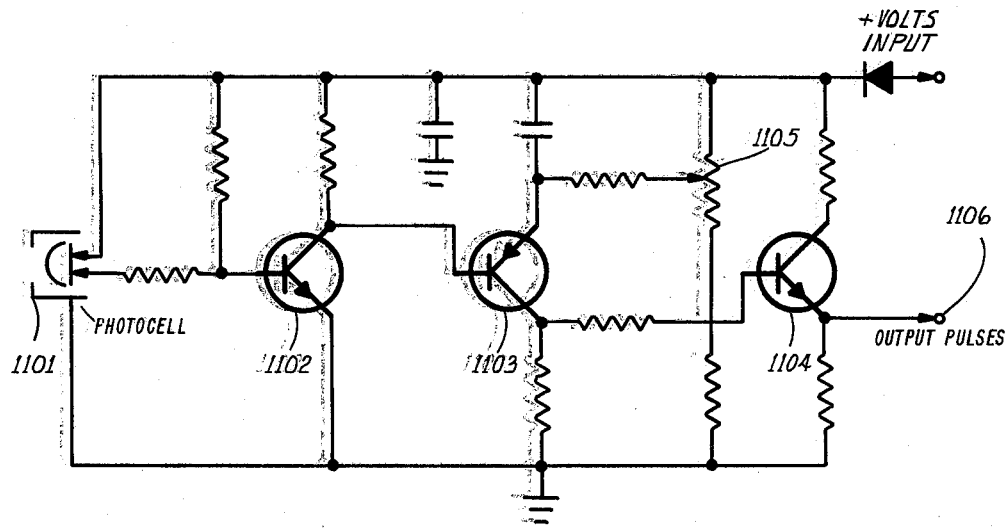
FIGURE 11 is a schematic diagram of a typical optical data preamplifier for amplifying photo-cell signals.

Considering the preferred angle data pick-up instrumentation, which is the photocell pick-up system, it will be noted that four photocells, two for each array, are mounted on the antenna pedestal, located at 1017 and 1018 in FIGURE 10. The photocell system eliminates the need for a gear connection between the scanning arrays and the data take-off units. Light from a source near the photocell is focused through a prism and a lens to a curved scale attached to the antenna beam with graduations inscribed corresponding to the 20 degree scan sector. The scale is laterally divided into a coarse-data track containing 64 increments and a fine data track containing 1,024 increments. Consider the coarse data channel. As the light beam passes over the coarse increments, light rays of varying intensity are reflected through the lens and prism to photocell (light sensitive semiconductor types) 1101. In FIGURE 11 there is illustrated a typical optical data preamplifier for amplifying the photocell signals. Photocell 1101 acts as a variable resistor whose resistance changes as the intensity of the reflected light changes. The varying resistance causes a fluctuating current through transistor 1102 and a pulse is developed as the light beam passes over each coarse increment. These pulses are amplified in two direct coupled, grounded-emitter stages 1103 and 1104. Potentiometer 1105 compensates for leakage current in the amplifier. The output current pulses at output 1106 are capacitively coupled to the optical data shaper shown in FIGURE 12 at input 1204. The shaper consists of two grounded-emitter amplifier stages 1201 and 1202. The output pulses at output 1203 of the shaper are then routed to the encoder. Fine data circuitry is similar to coarse data circuitry. Besides coarse and fine pulses, "turn-around" pulses are also generated from "turn-around" indentations impressed on the scale.

Since the fine data channel provides a count every fraction of a degree (in the present example every .02 degree), electronic circuitry must be provided to start counting at a very precise angle and to encode binary code groups at precise angles. The function is accomplished by means of a 6 place binary counter, whose input is the train of pulses from the coarse-data channel. At the occurrence of each coarse pulse, the state of the counter is transmitted in a suitable code, and the counter is advanced by one unit. Thus each code group announces the precise angle of the antenna beam. The fine data channel pulses are transmitted individually, 16 pulses occurring for each coarse data code. The fine data pulses are used by the airborne receiver for interpolating angle data between the coarse data codes.

The data encoder also develops a single-pulse range reply, when a range integration signal is received from an approaching aircraft.

The data encoder in the azimuth and elevation sections of the system under discussions are fundamentally the same. Therefore, the following detailed discussion can apply to either section, the elevation case being the general basis of discussion, however.

Angular position information taken from the data take-off units of each scanning antenna is delivered to the encoder in the form of positive pulses. The antenna switch logic circuits in the encoder permit only the downward scanning information to be encoded. The antenna switch logic circuits determine which antenna is in the downward scan by means of "turn-around" pulse pairs inscribed on the coarse and fine portions of the tone wheels and switch the encoder input to the appropriate data take-off unit.

The dual antenna array as shown in FIGURE 10 is to be assumed in the following discussion relative to the encoding system and reference will be made to the antenna arrays as "left hand antenna" and "right hand antenna."

Figure 13A:
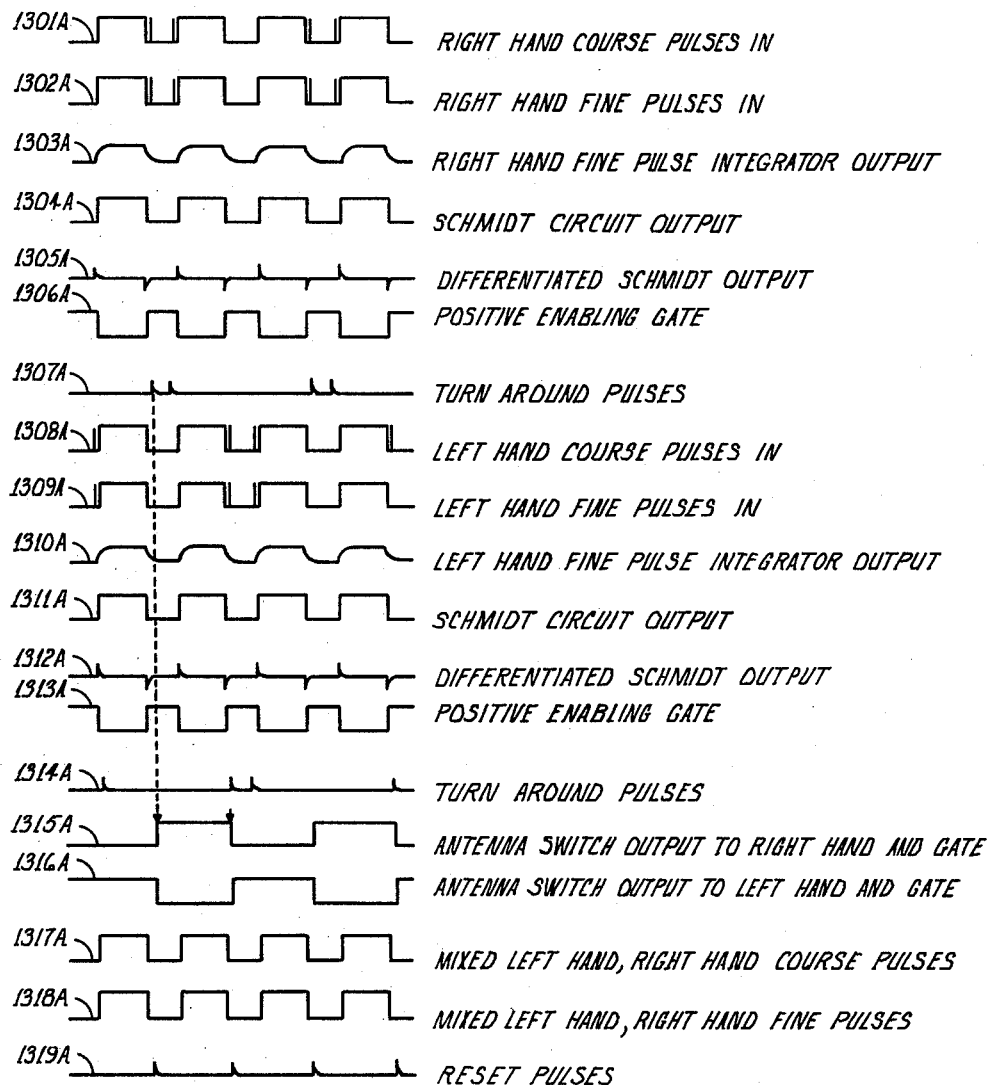
FIGURE 13A illustrates the timing sequence of the antenna switching circuits.

A block diagram of the antenna switch logic circuits, a part of the encoder, is shown in FIGURE 13 and the timing chart depicting the sequence of events within the said logic circuits is shown in FIGURE 13A. In discussing the antenna switch logic circuits, both FIGURES 13 and 13A will be referred to. Each of the two figures will carry the 1300 series number. The FIGURE 13A numbers will be followed by the letter "A." The fine and coarse pulse outputs from the right and left hand fine and coarse shapers are fed to their respective inputs in the encoder, to wit, "right hand" fine and coarse inputs 1301 and 1302 respectively, and "left hand" fine and coarse inputs 1303 and 1304 respectively, shown in the timing chart, FIGURE 13A, at 1301A, 1302A, 1308A, and 1309A. The pulses are then amplified by the pulse amplifier common to each input; shown in FIGURE 13 as pulse amplifiers 1305, 1306, 1307, and 1308. Assume that the "right hand" antenna is finishing its upward scan and about to begin to scan downward. The last of the fine pulses from the upward scan has ended the 20 microsecond gates derived from the one-shot (monostable) multivibrators 1309 and 1310 in the right hand coarse and fine channel, 1311 and 1312 in the "left hand" channel. (A one-shot multivibrator is one that remains in a quiescent state until triggered, then reverses its state of conduction for a predetermined amount of time, then returns to its quiescent state.) In turn, this action causes the pulse integrator 1315 and 1324 to cease integrating as shown at 1303A and 1310A. The decreasing voltage from the pulse integrators 1315 and 1324 causes the Schmidt trigger circuits 1316 and 1325 to reverse their state of conduction, producing a negative step voltage as shown at 1304A and 1311A. The steep edge of each Schmidt trigger circuit 1316 and 1325 is differentiated into a pulse shown at 1305A and 1312A, triggering the 75 millisecond monostable multivibrator 1317 and 1323. The triggering of the 75 millisecond multivibrators 1317 and 1323 by the Schmidt trigger circuit common to it sends a positive enabling gate 1306A and 1313A, to the antenna switch "and" stage 1314 in the "right hand" channel and 1322 in the "left hand" channel. A negative inhibiting gate to the RHF (right hand fine) "and-1" stage 1319 and the RHC (right hand coarse) "and-2" stage 1320 and the "and-3" "and-4" stage 1327, 1328, LHF and LFC (left hand fine and left hand coarse) respectively. (The "and" circuit often referred to as a coincidence circuit, can be designed to handle two or more inputs. The circuit has a single output at which a pulse appears if, and only if, a pulse is applied simultaneously to the inputs. If the input pulses are not of the same duration, the output pulse will appear only during the time interval that the input pulses overlap.) The negative inhibiting gate prevents the transmission of spurious pulses through the "and-1," "and-2," "and-3," "and-4" stages, during the 75 millisecond turn-around interval. During the time the "right hand antenna" is passing out of the upward scan and into the downward scan, two turn-around pulses 1307A are switched through the antenna "and" stage 1314 in the "right hand" channel. The resulting pulses are amplified by trigger amplifier 1318 and routed as triggers to the antenna switch 1321 a bistable multivibrator. The trigger pulses cause the antenna switch 1321 to send a positive voltage to the RHF, RHC, "and-1" "and-2" stage, 1319 and 1320, and a negative voltage to the "and-3" "and-4" stage 1327, 1328 respectively. The antenna switch 1321 maintains this stable output throughout the entire downward scan of the right-hand antenna, as shown in the timing sequence chart at 1315A and 1316A, antenna switch output to the "right hand" "and" circuits 1319 and 1320 and to the "left hand" "and" circuits 1327 and 1328.

At the end of the 75 millisecond turn-around interval, the negative inhibiting gate to the "and-1" "and-2" stage 1319 and 1320 ceases. Positive coarse and fine pulses begin to feed into the encoder "or-1" and "or-2" stage, 1329 and 1330 respectively, since the right-hand input pulses to "and-1" and "and-2" stage 1319 and 1320 have the same polarity as the positive voltage input from the antenna switch 1321. "Left hand" coarse and fine data pulses 1308A and 1309A being of opposite polarity to the negative voltage 1316A from the antenna switch 1321 are not recognized by the "and-3," "and-4" 1327, 1328 stage, i.e., coincidence does not take place, therefore, during this period of time the pulses from the "left hand" antenna are not fed to the "or-1" "or-2" stage 1329 and 1330. (The "or" circuit is basically a buffer or mixing circuit which permits a plurality of pulse sources of common pulse polarity to be connected to a common load.)

Circuitry in the left-hand channel is identical to the circuitry in the right-hand channel. When the "left hand antenna" starts scanning downward, the antenna switch 1321 reverses and sends a negative voltage to the "and-1" "and-2" stages 1319 and 1321, and a positive voltage to the "and-3" "and-4" stages 1327 and 1328 due to the "turn-around" pulses now appearing in the "left hand" channel, shown at 1319A, and in turn amplified by trigger amplifier 1326 which feeds the pulses to antenna switch 1321 reversing its state of conduction.

An additional function of the antenna switch 1321 is to deliver voltages to a squaring amplifier 1331. The output of squaring amplifier 1331 is differentiated and this output is fed to reset generator 1332. The resulting reset pulses shown at 1319A, developed as each antenna starts its downward scan, are used to reset the coarse and fine binary counters of the coding circuits.

Figure 14:
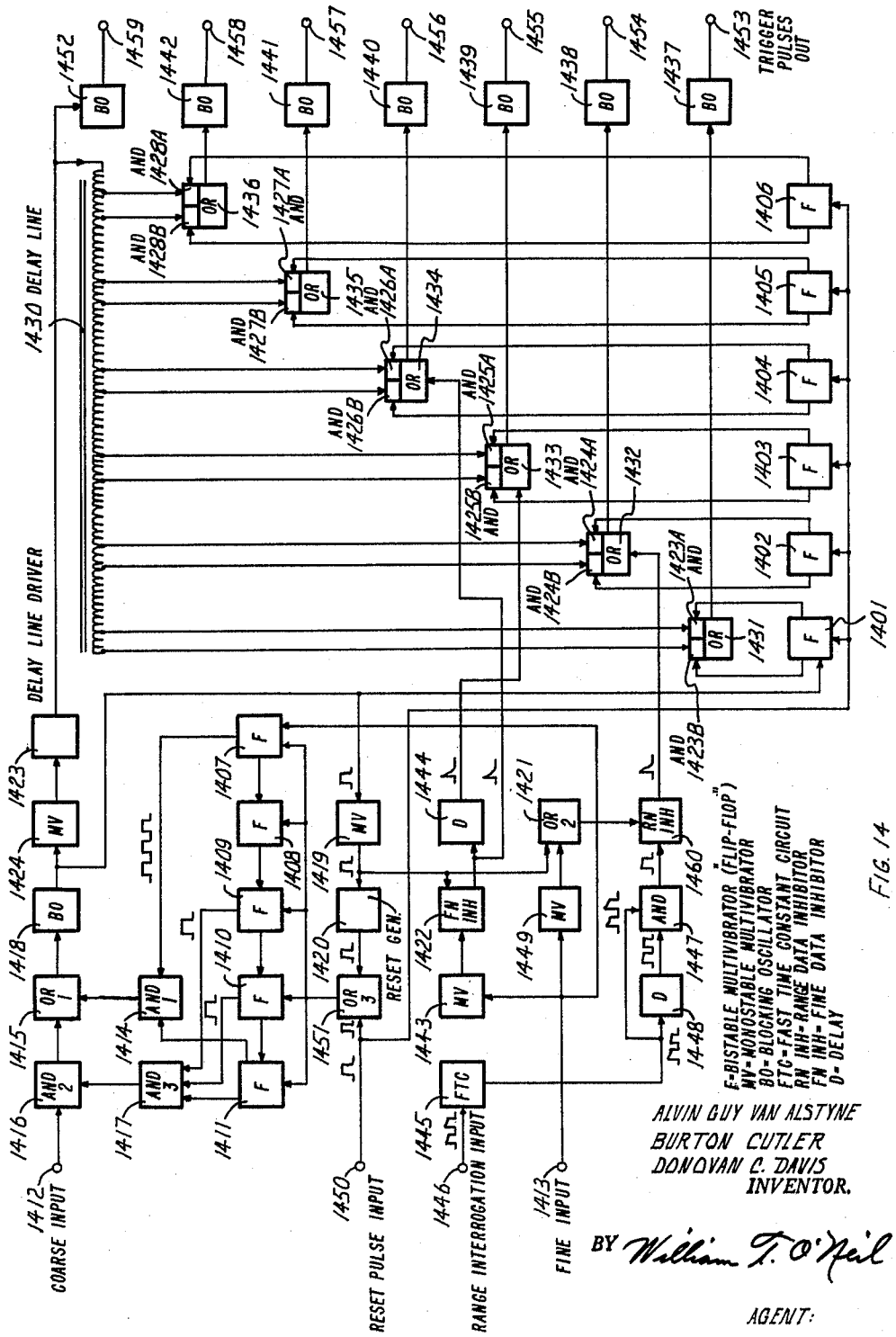
FIGURE 14 is a block diagram of the encoder. The encoder receives the angle data information via the antenna switch logic circuits and converts this information into coded pulse groups.

From the antenna switch logic circuits section of the encoder, the reset, the coarse, and the fine pulses are delivered to the encoder coding section, shown in FIGURE 14.

The coarse and fine data pulses are counted, and the information is stored by serial flip-flops (bistable multivibrators) 1401 through 1411 respectively. Flip-flops 1401 through 1406 count the coarse pulses, flip-flops 1407 through 1411 count the fine pulses. The coarse and fine pulses derived from the coarse and fine outputs 1333 and 1334 and reset pulse output 1335 shown in FIGURE 13 are connected to the coarse and fine input data lines 1412 and 1413 and reset pulse input line 1450 of FIGURE 14.

In order to assure accuracy of count and reliability of performance, additional logic circuitry allows only coarse data, which should appear simultaneously with every sixteenth fine pulse, to be counted. If no coarse pulse appears during this period, because of a system malfunction, an artificial pulse is created on the seventeenth fine pulse count. At this instant, the positive coincident voltage outputs of flip-flops (bistable multivibrators) 1407 and 1411 are fed to "and-1" 1414, which produces the coarse pulse sent to "or-1" 1415.

Any spurious pulses developed in the coarse data channel are blocked by "and-2" stage 1416. A coarse pulse is switched through this stage only during the time a positive coincident pulse is applied to this stage from "and-3" stage 1417. This positive coincidence pulse is generated by the fine data flip-flops 1407 through 1411, and the "and-3" stage 1417 at each sixteenth fine pulse count.

Any coarse pulse, artificial or otherwise, from the "or-1" stage 1415, is sent through a blocking oscillator 1418 from the blocking oscillator to a 26 microsecond one-shot multivibrator (monostable multivibrator) 1419 and from the one-shot multivibrator to a reset generator 1420 where a reset pulse is formed. The reset pulse restores the fine data flip-flops 1407 through 1411 to a zero count. The 26 microsecond one-shot multivibrator 1419 is also delivered to the range data inhibitor 1460 via "or-2" stage 1421, and to the fine data inhibitor 1422. The inhibitors 1460 and 1422 block fine data and range data, when a coarse pulse is in transmission. A 20 microsecond gate derived from the 20 microsecond one-shot multivibrator 1449 is also fed to the "or-2" circuit 1421. This gate is routed to the range data inhibitor 1460 via "or-2" circuit 1421, inhibiting range data when a fine pulse is in transmission. More information on the inhibitors will be presented later in the discussion. In summary, the appearance of a coarse pulse resets fine data storage, inhibits fine data transmission, and inhibits range data transmission.

Coarse data pulses from blocking oscillator 1418 mentioned in the last paragraph also are delivered to six coarse data flip-flop counters 1401 through 1406 each of the coarse data flip-flops have two output voltages fed to two "and" stages 1423A and B through 1428A and B. In addition, the "and" stages receive readout pulses from the delay line 1430. Output pulses from the "and" stages are routed through "or" stages 1431 to 1436 to six blocking oscillators 1437 through 1442. During the downward scan of an antenna, the delay line driver 1423 receives 64 coarse data pulses via the 9 microsecond multivibrator 1424. Each of these coarse pulses from the delay line driver 1423 produces a reference pulse and a burst of six pulses (one pulse in each of the output channels to blocking oscillators 1437 through 1442 via delay line 1430). The six pulses are time-spaced by means of delay line 1430 with respect to the reference pulse, generated by the blocking oscillator 1452, in order to represent a binary code. This code indicates the coarse angular position of the downward scanning antenna. The six coarse data flip-flops 1401 through 1406 are reset to a zero count at the beginning of each downward scan of the antenna by the arrival of the reset pulse at the reset pulse input 1450. This same reset pulse also resets the five fine data flip-flops 1407 through 1411 being fed to the said flip-flops via "or-3" stage 1451.

Fine data are sent to the following three places: (1) to fine counting flip-flops 1407 through 1411 (mentioned earlier in the discussion); (2) to range inhibit circuitry;

(3) and to a 10 microsecond one-shot (monostable) multivibrator 1443. The one-shot multivibrator 1443 delays each fine pulse for 10 microseconds. The delayed fine pulse is amplified and routed to the fine data inhibitor 1422. If a coarse pulse is being transmitted, a gate from the 26 microsecond one-shot multivibrator 1419 blocks the fine pulse at the fine data inhibitor 1422. Otherwise, the fine pulse passes through the fine data inhibitor 1422 to "or" stage 1434 in the encoder output channel. Another output path from the fine data inhibitor 1422 contains a 0.6 microsecond delay line 1444 which delays the fine pulse to "or" stage 1433 in the encoder output channel. In effect, a double-pulse (0.6 microsecond apart) is produced from the output pulse of the fine data inhibitor 1422. Fifteen double-pulse fine counts are transmitted between each group of coarse data bursts.

Range interrogation input 1446 from the range receiver is a two-pulse group spaced 0.9 microsecond apart. The two-pulse group is sent through an FTC (fast time constant) circuit 1445 with two parallel output paths. One path directs the two-pulse group to an amplifier and "and" stage 1447. The other path routes the two-pulse group through a 0.9 microsecond delay line 1448 to the same amplifier and "and" stage 1447. The first pulse of the two-pulse delayed group is coincident with the second pulse of the undelayed group. Therefore, the output of the amplifier and "and" stage 1447 is a single pulse. Any noise bursts are developed into a single pulse by the FTC circuit 1445. Because of the delay line 1448, the delayed noise pulse input to the amplifier and "and" stage 1447 is not coincident with the undelayed noise pulse input. Thus, there is no output pulse from the "and" stage 1447, when noise is introduced into the circuit. The decoded single-pulse range reply from the "and" stage 1447 goes to the range data inhibitor 1460, which receives an inhibiting gate of opposite polarity to the range pulse whenever coarse or fine data are transmitted. The logic is so arranged that a range reply cannot be made during a 26 microsecond interval which brackets (or contains) a coarse data group, or during a 20 microsecond interval which brackets a fine pulse pair. The range pulse from the inhibitor is delivered to "or" stage 1432 in the encoder output channel. The design of semi-conductor types of blocking oscillators, multivibrators, "and" and "or" circuits suitable for operation in the encoder are delineated in considerable detail in the handbook entitled, "Handbook of Semi-conductor Electronics," by Lloyd P. Hunter, in particular chapters 14 and 15 entitled "Transistor Oscillators" and "Transistor Switching Circuits," published in 1956 (first edition) by the McGraw-Hill Book Company of New York city, New York.

Range and angular information in coded pulse form are coupled from the encoder to the modulator.

Figure 15:
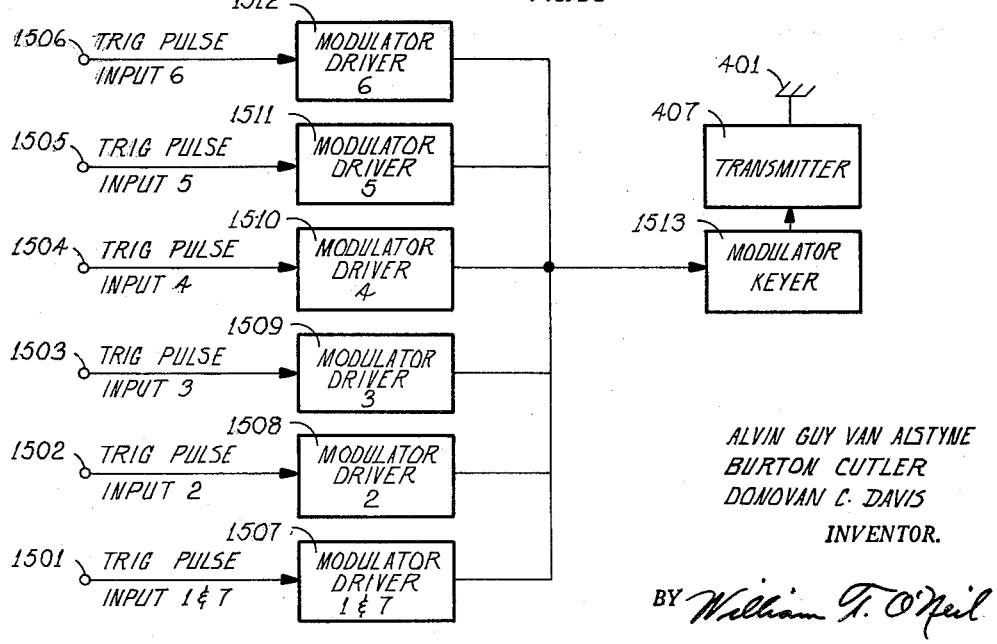
FIGURE 15 is a block diagram of the basic modulator-transmitter, a part of the ground equipment.

The trigger pulse outputs from blocking oscillators 1437 through 1442 and 1452 at trigger pulse outputs 1453 through 1459 are fed to the modulator-transmitter section. A basic block diagram of this section is shown in FIGURE 15. The above trigger pulse outputs are connected to their respective trigger pulse inputs 1501 through 1506. These seven inputs are amplified by the modulator driver 1507 through 1512 common to the particular input. The amplified trigger pulse output from the modulator drivers 1507 through 1512 are mixed non-additively, and applied to modulator keyer 1513. From the modulator keyer 1513 they are fed to the transmitter 407, pulse modulating the RF (radio frequency) output of the said transmitter. These coded groups in the form of modulated RF energy are fed to antenna 401. The radiated RF energy is in the form of a series of discrete codes designating the beam angle of the radiated beam.

Figure 16:
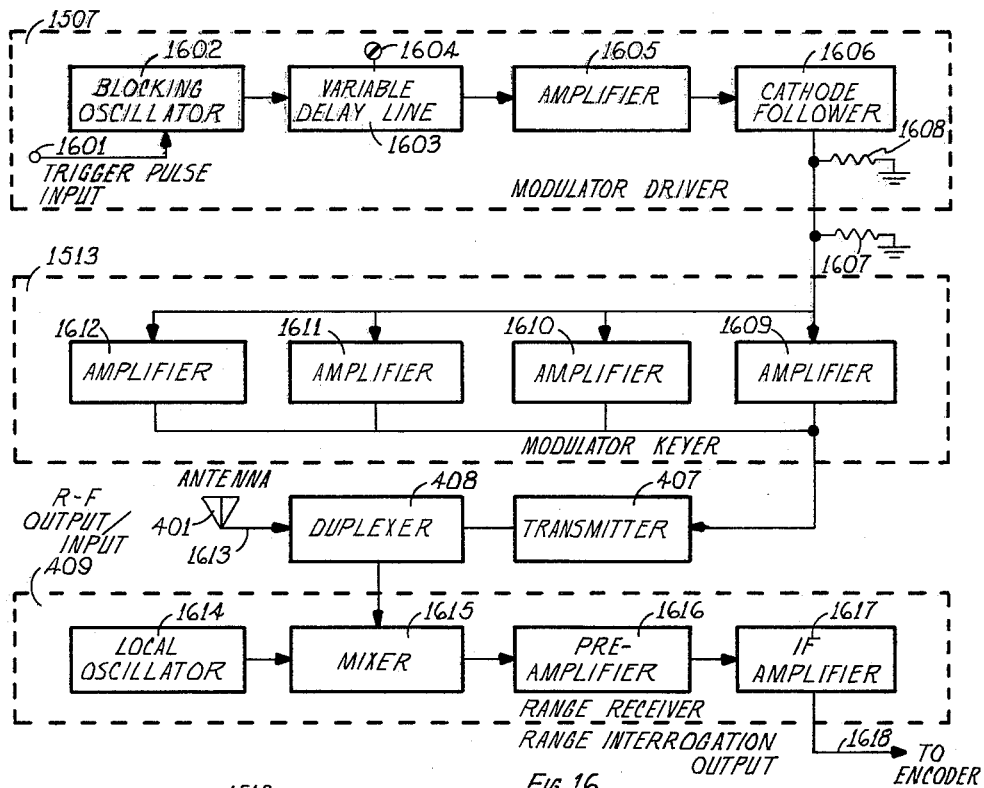
FIGURE 16 is an expanded block diagram of the modulator-transmitter shown in FIGURE 15 and includes the range receiver.

The six modulator drivers 1507 through 1512 are identical. As shown in FIGURE 16, each modulator driver 1507 comprises a blocking oscillator, amplifier and cathode follower. The trigger pulse input 1601, a positive going 10 to 30 volt pulse from the encoder, is fed to the blocking oscillator. The output from the blocking oscillator 1602 is about 0.5 microsecond in duration. In order to establish a precise rectangular pulse of 0.25 microsecond width, plus or minus 0.01 microsecond, an adjustable delay line 1603 is used. A pulse width adjustment 1604 on the delay line 1603 permits setting the duration of the pulse output from blocking oscillator 1602 within 0.3 microsecond duration. The output from the blocking oscillator 1602 fed to amplifier 1605 via the variable delay line 1603 is a 500 volt positive pulse. The output of amplifier 1605 is a 1500 volt positive pulse. This pulse is fed to a conventional cathode follower 1606. The cathode follower matches the low impedance of the following modulator keyer 1513. Since the gain in this stage is less than unity, the pulses to the external cathode resistor 1607, common to all six modulator drivers (in parallel with individual cathode resistor 1608 at the output of each driver) is approximately 850 volts in amplitude. This output pulse is applied to the modulator keyer 1513.

The modulator keyer 1513 consists of four parallel connected pulse amplifiers, 1609 through 1612. The output of these four parallel connected amplifiers provide a 1600 volt 65 ampere pulse. This pulse is fed to the transmitter 407. The transmitter consists of a conventional microwave magnetron oscillator. The pulse modulated RF output on the RF output/input line 1613 is fed to antenna array 401 via duplexer 408. The voltage and current of the pulse delivered to the magnetron is dependent on the input requirements of the particular magnetron employed, and the details of circuit design of the above discussed functions is conventional and well known in the art. The range receiver 409 is a typical microwave superheterodyne type receiver employing a klystron local oscillator 1614, crystal mixer 1615, a preamplifier 1616 consisting of a cascode low noise stage and two stages of amplification, and an IF (intermediate frequency) amplifier 1617 consisting of eight stagger-tuned stages which have (in the particular receiver used in the present system) a center frequency of 60 megacycles. The output on line 1618 is fed to the encoder shown in FIGURE 14 at Range interrogation input 1446.

Up to this point only the details of the ground equipment relative to the present invention have been discussed.

The airborne equipment consists of a receiver-converter and low power magnetron transmitter and associated modulator.

The receiver converter is composed of four main sections: Receiver-detector, Video amplifier, AGC amplifier, and Decoder. The decoder can be broken down into three sections as follows: Coarse data decoder, Register, and Digital to analog converter.

Coded information transmitted by the ground equipment is received by the aircraft's antenna, detected directly into video and fed to a video amplifier. Here it is amplified and standardized, then sent to the decoder. The decoder "unlocks" the security code and converts the information into digital form. This digital information is then sent to the digital analog converter where it is converted to analog voltage.

Video is sampled from the video amplifier and sent to the AGC amplifier where it is stretched and integrated, to be fed back to the detector as a bias voltage. This bias voltage is used to regulate the amplitude of the incoming signal.

The transmitter system can be broken down into four sections as follows: (1) Beam center detector, (2) Transmitter, (3) Range tracking, and (4) AGC (automatic gain control) system. The beam center detector, detects the null of the received dual lobe and triggers off the transmitter. The transmitter sends a dual pulse back to the ground station for range tracking information. Range tracking information from the ground is received and is fed to the range tracking system where it is measured and converted to an analog voltage which operates the DME (distance measuring equipment) meter in the aircraft.

Referring to FIGURE 17, the train of pulses riding on the dual lobe of the ground station transmitted envelope arrives at the airborne antenna 1701. It passes down the waveguide 1702 to the duplexer 1703. The pulse train senses a short circuit on the magnetron side 1704 of duplexer 1703, therefore travels to the 15 megacycle band-pass filter 1705. The pulse train passes through the filter 1705 and enters the microwave crystal detector 1706 which removes the RF, leaving only the video pulses riding on the dual lobe envelope. This video is amplified by video amplifier 1707.

Figure 19:
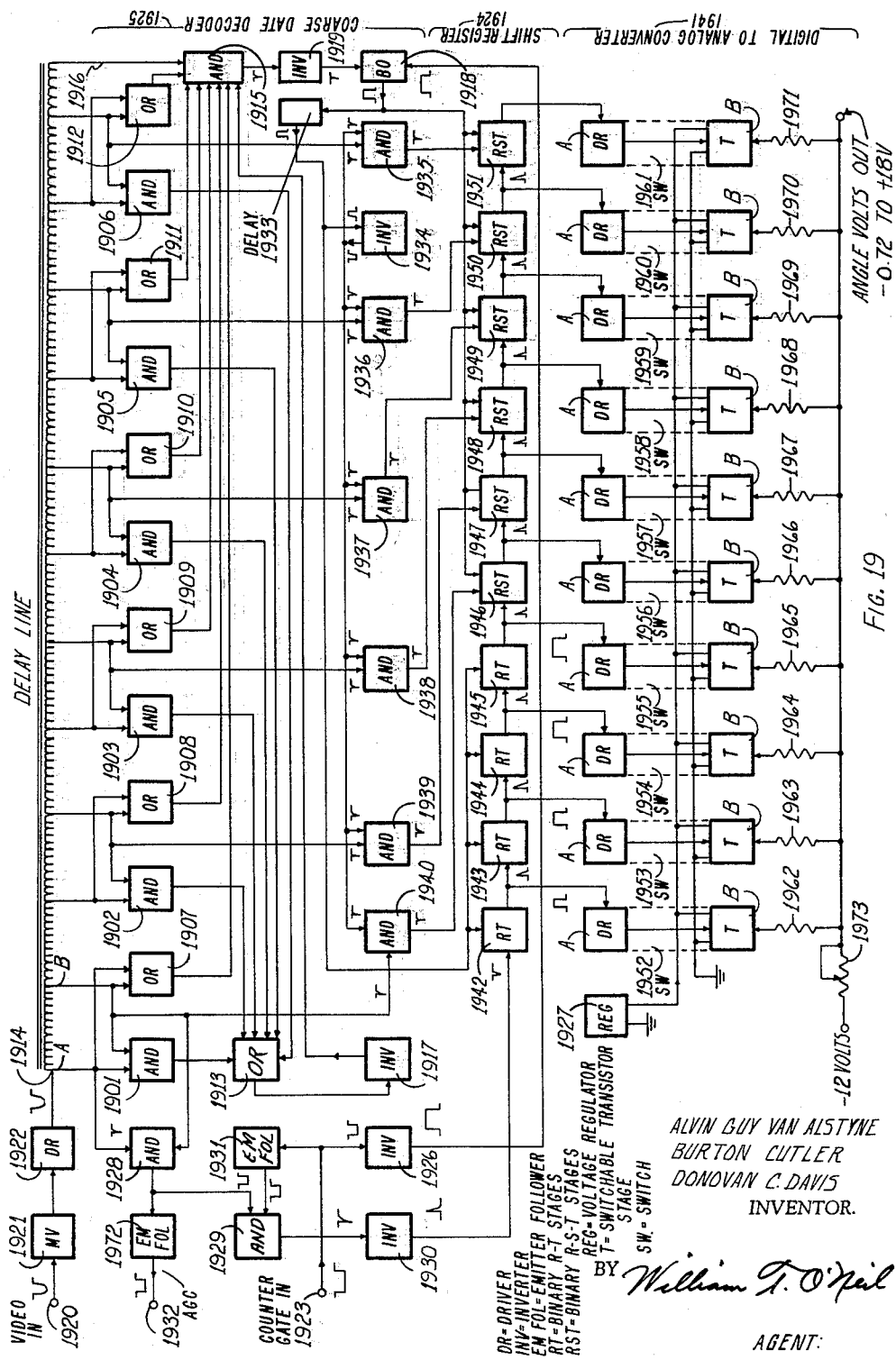
FIGURE 19 is a block diagram of the airborne decoder.

AGC video is received from the pre-amplifier in the video amplifier 1707 and is sent to a delay line amplifier 1708 where it is amplified and fed into a 0.75 μsec. delay line 1709. The delayed video pulses pass through the phase splitter 1710 which acts as an isolation network for the two gated amplifiers, 1711 and 1712 respectively. A fine count pulse at input terminal 1720 coming from the decoder at the AGC and tracker output terminal 1932, as shown in FIGURE 19, is sent to the 1 microsecond and 8 microsecond blocking oscillators 1713 and 1714 respectively. The 1 microsecond blocking oscillator 1713 turns on gated amplifiers 1(1711) and 2(1712). Video pulses now pass from the phase splitter 1710 through gated amplifier 1712 to the stretcher 1715 where they are stretched and sent to the AGC integrator 1716. The integrated video pulses are sent back to the AGC circuit in the video amplifier 1707 which converts them into a D.C. bias voltage which is applied to the crystal detector 1706 in the waveguide to control the incoming video signal amplitude. At the same time, pulses passing through gated amplifier 1(1711) enter the 12 microsecond delay line 1717. The 8 microsecond blocking oscillator 1714 that was actuated by the fine count pulse from the decoder shorts (immobilizes) the peak detector 1718 prior to the video train coming through the 12 microsecond delay line 1717. Video then passes from the delay line and charges the peak detector 1718. The peak detector 1718 is shorted out prior to each pulse coming through. The now stretched gated pulses pass through a 2 kilocycle lowpass filter 1719 which filters out the pulses and leaves only the dual lobe of the original received envelope.

Figure 18:
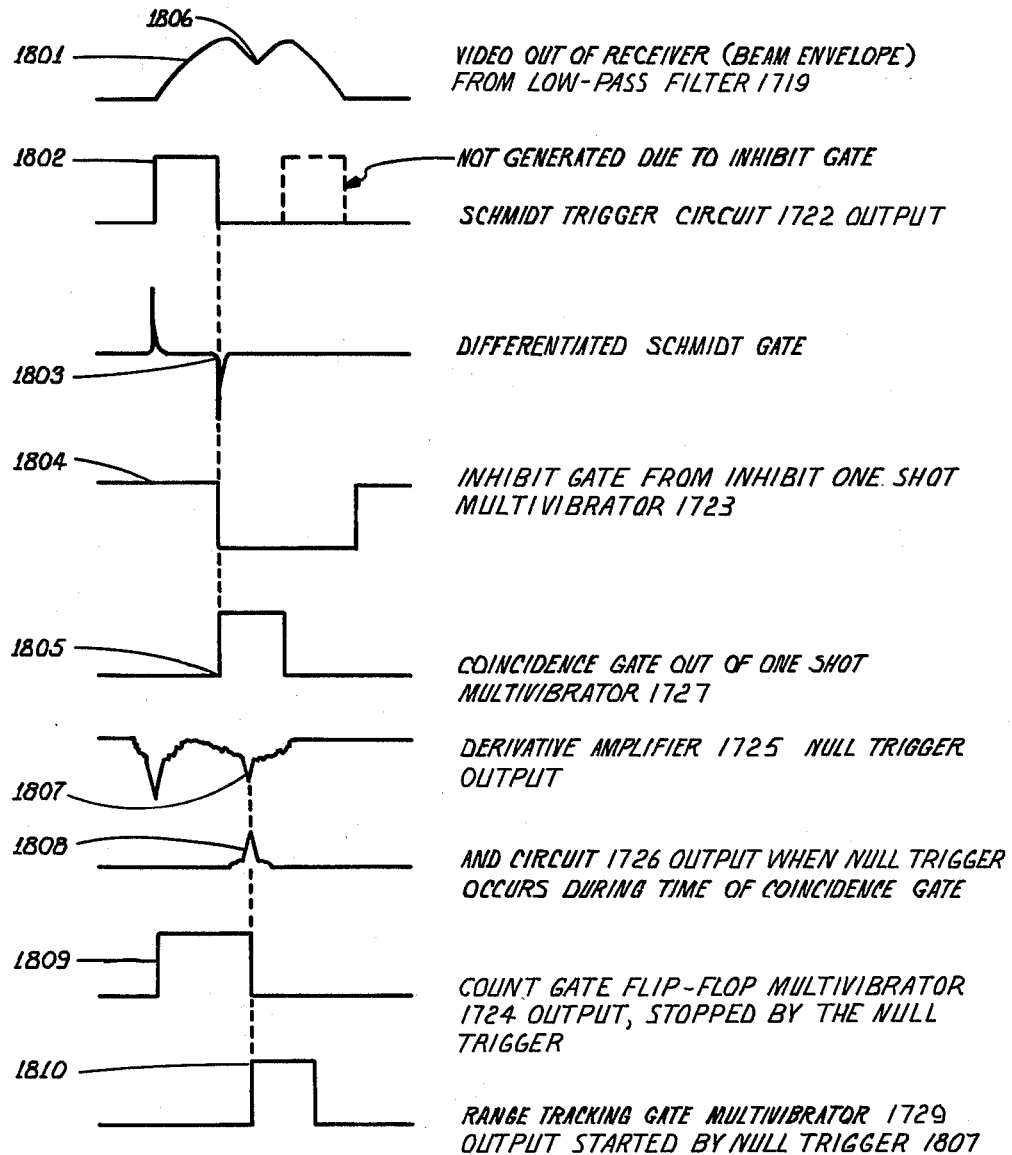
FIGURE 18 is a timing chart depicting the series of events relative to detecting the beam-center null.

FIGURE 18 shows the waveforms and timing of the beam center detector, a part of FIGURE 17, and will be referred to all various times during the discussion relative to FIGURE 17, the receiver and beam center detector. Therefore, any 1800 series numbers will be related to FIGURE 18 while the 1700 series numbers will be related to FIGURE 17.

The dual lobe 1801 from the lowpass filter 1719 is sent to the differential amplifier 1721. The first lobe to overcome the bias of the differential amplifier is now amplified and used to fire the Schmitt trigger circuit 1722 (Schmitt trigger circuit output 1802) which forms a gate of the same duration as the first lobe. This output is differentiated and the trailing edge of 1802 of the differentiated gate 1803 is used to turn on the inhibit one-shot multivibrator 1723. This in turn clamps the Schmitt trigger circuit 1722 and keeps it from firing until the next scanning lobe appears, inhibit gate 1804. The leading edge of the differentiated gate 1803 from the Schmitt trigger circuit 1722 is used to turn on the count gate flip-flop multivibrator 1724. The count gate 1724 at count gate output terminal 1733 is also referred to as the decode gate and is used to unlock the data decoder. The duration of the gate is equal to the time the Schmitt trigger circuit 1722 starts firing to the time the null point 1806 is reached, as shown at 1809. The output from the differential amplifier is also sent through a derivative amplifier 1725 where the derivative of the beam envelope 1801 is made to produce sharp negative spikes 1807 at the leading edge of the lobe and the leading edge of the null. These spikes 1807 are sent to the "and" circuit 1726.

The trailing edge of the Schmitt trigger 1803 used to fire the coincidence one-shot multivibrator 1727 forming a gate which is fed to "and" circuit 1726 and the count gate flip-flop multivibrator 1724. If the gate from the coincidence one-shot multivibrator 1727 is present during the time that a spike arrives at the "and" circuit 1726, "and" circuit 1726 will send a trigger 1808 to the trigger amplifier 1728. The trigger from the trigger amplifier 1728 is sent to the count gate flip-flop multivibrator 1724, which turns it off at exactly the null point of the dual lobe envelope. The trigger from the trigger amplifier 1728 is also sent to the range tracking gate one-shot multivibrator 1729. This produces a ranging gate 1810 which is sent to the trigger generator via the range track gate output terminal 1732 in the modulator section of the transmitter.

Video pulses arriving at the video amplifier 1707 are amplified and sent to the pulse standardizer 1730. The pulse standardizer maintains the amplitude of the pulses at a level of approximately 6.0 volts, 0.2 microsecond in duration at output terminal 1731. From here the pulses are sent to the coarse data decoder shown in FIGURE 19.

Referring to FIGURE 19, the coarse data decoder 1925 decodes digital information in video signal form derived from the ground equipment, and converts this information into signals capable of being stored in a shift register. "And" circuits 1901 through 1906 look at each pair of assigned times so as to reject any code group in which both assigned times of any of the six pulses are filled. The "and" circuits are looked at by an "or" circuit 1907 through 1912 common to the "and" circuit and the signal seen is inverted by inverter 1917 to become a "not" signal, indicating no extra pulse is present. Each pair of assigned times is also looked at by an "or" circuit 1913, indicating that each pair of assigned times has at least one pulse present.

The code group is sent into the master decoding delay line 1914, when the first (reference) pulse reaches the opposite end of the line, an "and" circuit 1915 looks simultaneously at the six "or" circuits 1907 through 1912 the reference pulse on line 1916 and at the "not" signal from inverter 1917. If all are present, the "and" circuit 1915 sends a pulse to the decode blocking oscillator 1918 via inverter 1919, indicating one and only one pulse is present in each of the assigned times, thus a valid code is present in the delay line 1914.

The FTC (Fast Time Constant) video at the video input connector 1920 from the video standardizer 1716 of FIGURE 17, is fed to a one-shot multivibrator 1921 for shaping (approximately 0.2 micro-second pulse width), this output goes to line driver 1922 which develops negative 30 volt pulses (referenced at +24 v.) across the master decoding delay line 1914. A delay line (7.2 microsecond with 0.6 microsecond taps) is used for both coarse and fine decoding. Coarse decoding occurs when a valid code group is present. The coarse code group, radiated from the ground equipment, consists of seven pulses within a 7.2 microsecond period. There is a reference pulse, and six pulses each having two assigned times. Coarse decode pulse fires blocking oscillator 1918 via inverter 1926, if decode gate at count gate input 1923 (indicating first lobe of beam) is present. When this occurs, blocking oscillator 1918 first sends a reset pulse to shift register 1924 and then 0.6 microsecond later allows coarse group to set coarse register in parallel. The fine code consists of 15 pairs (0.6 microsecond spacing) of pulses used for interpolating between coarse groups. They are paired for security coding only. Decoding is accomplished by "and-ing" the signals from the input to the master delay line 1914 and then from the first tap B, 0.6 microsecond later. This signal after being "and-ed" by "and" circuit 1928 with the count gate from emitter follower 1931 by "and" circuit 1929 toggles the shift register 1924 via inverter 1930. The fine count pulse is also sent to the AGC (Automatic Gain Control)

and range track or via emitter follower 1972 to AGC Range Tracker Output terminal 1932 as a pulse, signifying security decoding has occurred.

Assuming proper decoding, the decoded signal or pulse is standardized in the 0.4 microsecond blocking oscillator 1918 for registered gating and re-setting. This pulse provides coarse data reset and when delayed 0.3 microsecond by delay line 1933 fine count reset to the register 1924. The delayed pulse is also inverted by inverter 1934 for the coarse data readout "and" gates 1935 through 1940, so that the register may accept the digital information available in the delay line. Actual setting of the register occurs 0.6 microsecond after initiation of the decode pulse. Since the decode pulse is inherently delayed approximately 0.15 microsecond immediate decoding of the 0.25 microsecond pulses is marginal so the 0.3 microsecond delay line 1933 is added. The readout occurs 0.6 microsecond further down the delay line and the count gate out of inverter 1926, approximately 3 milliseconds, bracketing the desired readout positions. The first two positions A and B on the delay line 1914 are "anded" together to provide a register toggle and output pulse for every 0.6 microsecond pulse pair that appears. Consequently, each time a fine count pair or a coarse code group containing 0.6 microsecond pair enters the line, the register is advanced one.

The shift register 1924 of this unit accepts information from the decoder 1925 in the form of pulses, and sends gates to the digital-to-analog converter 1941, indicating which coarse "bits" are on and how many fine pulses have been counted. This section consists of a four-stage binary R-T (reset and toggled) shift register 1942 through 1945, followed by a six-stage R-S-T (reset, set and toggled) register 1946 through 1951. The reset pulses are identical, coming from the coarse decode section 1925 via blocking oscillator 1918. The toggle pulse for the first R-T flip-flop is the gated fine count pulse from inverter 1930. The six set pulses for the R-S-T register are the six coarse set bits from "and" circuits 1935 through 1940. Initially, the register is cleared by a reset pulse from blocking oscillator 1918, and the R-S-T register is set according to a coarse group of set pulses from "and" circuits 1935 through 1940. The fine count pulses from inverter 1930 toggle the R-T register, counting these and on the 16th fine pulse, toggling the first R-S-T flip-flop stage 1946. If no coarse decode pulses occur, the fine count pulses will continue to count as long as they come in. If a coarse decode pulse occurs at this time, as it should, the register will be reset to repeat the cycle.

The 10-bit register 1924 provides memory from code group to code group. Essentially it is divided into two sections—coarse data and fine data. The coarse section is the most significant. Digits consist of 6 R-S-T flip-flops, 1946 through 1951, which are set by the aforementioned gated code group pulses (or lack of time depending upon the code). These flip-flops are reset approximately 0.4 microsecond before being set so that initially the register is clear. The fine data section of the register consists of 4 R-T flip-flops 1942 through 1945 and counts the fine data groups. These flip-flops are reset at the same time the coarse data section is set. Thus, the fine count sections counts up to 15 and upon receipt of the 16th pulse, which is of the coarse code group, toggles the coarse register in the condition it would be set by the code group anyway. Thus, redundancy is provided in case a pulse is missing from the coarse code group and standard decoding does not occur.

The digital-to-analog converter 1941 accepts the 10-bit information from the shift register 1924 and converts it from millivolt increments to an analog signal. The converter output of from −0.72 to 17.88 volts corresponds to the 0.02 degree angle increments provided for in the system of the present invention. Zero volts corresponds to zero degree. This analog voltage is now applied to the horizontal cross-pointer meter needle to give elevation information of the airplane in relation of the approach to touchdown. The information can also be fed into an autopilot for automatic landing.

The digital-to-analog converter section 1941 consists of a well-regulated power supply 1927, ten transistor SPDT switches 1952 through 1961 and a resistor summing ladder 1962 through 1971.

The power supply 1927 uses regulated 24 volts and supplies up to 180 ma. at 18.72 volts.

The transistor switches each consist of a driver A and a pair of transistors B tied to ground and 18.72 volts, respectively. The transistors used should have extremely low forward resistance.

The summing ladder 1962 through 1971 is a ten resistor binary summing unit ranging from about 500 ohms 1971 for the most significant bit to about 256,000 ohms 1962 for the least. An offset variable resistor 1973 compensates for leakage currents and allows a negative .72 volt output for negative 0.8 degree angle.

Referring now to FIGURE 20, the airborne transmitter, voltage from the power supply at the voltage input terminal 2001 is applied to a charging reactor 2002 which charges up to approximately twice the applied voltage value and is held at this point by a hold-off diode 2003 until the thyratron 2004 is fired. A range track gate applied to range track input terminal 2005 derived from the beam center detector, shown in FIGURE 17 (range track gate output terminal 1732) is used to trigger off a unijunction trigger circuit, trigger generator 2006 (a relaxation oscillator) which causes a silicon controlled rectifier (solid state thyratron 2004) to fire. It should be remembered that the range track gate appears immediately after detection of the beam null. The high voltage is formed into a high voltage pulse by the pulse-forming network 2007 having a duration equal to the time that the thyratron 2004 was conducting. This pulse is then applied across the primary of the pulse transformer 2008. The secondary is coupled across the magnetron 2009. This produces a pulse of RF energy, followed by a second pulse 0.9 microsecond later.

This second pulse is produced by a 0.45 microsecond delay line 2010, located between the pulse-forming network and the pulse transformer. The pulse voltage travels down the delay line and is reflected back 0.9 microsecond later to be applied to the primary of pulse transformer 2008. This produces the second pulse of magnetron 2009.

Pulse pairs from the magnetron 2009 now pass through the duplexer and associated waveguide to the antenna, shown in FIGURE 17 at 1703, 1702, and 1701 respectively, to be radiated to the ground station for range tracking information. A range trigger is taken off the pulse transformer 2008 and used to trigger the 2 microsecond blocking oscillator 2011. The blocking oscillator output 2012 is sent to the range tracking system.

The above radiated signals are received by the ground station and replies to the range query. This reply is detected by the receiver, then sent to the range tracker. In the range tracker the reply is measured (in time) and converted to an analog voltage which operates the DME meter in the aircraft. A block diagram of the range tracker is shown in FIGURE 21.

A reference trigger, the output 2012 of the 2 microsecond blocking oscillator 2012 shown in FIGURE 20, is fed to the reference trigger input terminal 2101, FIGURE 21. This reference trigger sets the flip-flop multivibrator 2102 into a state of conduction whereby the output is such that the input to switch 2104 via emitter follower 2105 allows the bootstrap circuit 2106 to start charging, producing a linear sawtooth waveform. A bias voltage sets the voltage level at which the pick-off pulse is initiated by pick-off 2107. At this point the ramp voltage is differentiated. The differentiated pulse is now amplified by pulse amplifier 2108 to an amplitude of approximately +12 volts. This pulse is then used to reverse the conducting state of the flip-flop 2102 and terminate the bootstrap sawtooth to zero amplitude. The pick-off pulse from pick-off circuit 2107 is also applied to the early gate blocking oscillator 2109. The gate output is sent through a .25 microsecond delay line 2110 to become the early gate. Another output is taken from the early gate blocking oscillator 2109 and is sent to the late gate blocking oscillator 2111 which produces the late gate. The overlap duration of the early and late gates measured at their apogee is approximately 1 microsecond.

Range video from the ground station at range video input 2115 is received from the video amplifier and is applied to an emitter follower 2112. The output is sent through a 0.75 microsecond delay line 2113 to an "and" circuit 2114. If no fine data count information is present at fine data input 2116, a 10 microsecond one-shot multivibrator 2117 allows the "and" circuit 2114 to conduct and produce range video. Range video from "and" circuit 2114 and narrow early and late gates from the early gate blocking oscillator 2109 via delay line 2110 and the late gate blocking oscillator 2111 are now applied to early and late "and" circuits 2118 and 2119, respectively. If they are both coincident the "and" circuits 2118 and 2119 will produce a pulse of approximately 0.2 microsecond in duration. These pulses are then sent through early and late stretching circuits 2120 and 2121 respectively which increases the duration of the pulses to about 200 microseconds in length. The stretched pulses from the early and late stretchers 2120 and 2121 now are applied to each side of a differential amplifier 2122. Here the gates are compared and if there is a difference in amplitude, an error voltage will be produced. This voltage is now known as Range Error.

Range Error is now sent to a gated peak detector 2123 (box car detector). A 3 millisecond gate from the null detector shown in FIGURE 17 is applied to the peak detector 2123, by way of the tracking gate input terminal 2140, to short it out prior to the range error voltage being applied. As the range error voltage is applied, the peak detector 2123 is allowed to charge up to the applied voltage. The stretched gated pulses now are fed into a velocity memory circuit 2124. The velocity memory circuit 2124 stores the information until the integrator amplifier 2125 is ready for it.

The integrator amplifier 2125 can best be described as a very high gain linear D.C. amplifier with a capacitor feedback network 2126. The stretched gate pulses from the velocity memory circuit 2124 are applied to the input of the integrator amplifier 2125 to be amplified. This is amplified and fed back again so that an output of a constantly increasing D.C. voltage of a uniform rate is produced. A portion of this voltage is fed to the pick-off pulse circuit 2107 to cut it off. Fixed resistors 2127, 2128, and 2129 are a part of the integrating network. The output of the integrator amplifier 2125 which is now an analog voltage is fed into the DME meter in the pilot's cockpit to indicate range from touchdown.

A distinction between the early and late gates produced by the early and late gate blocking oscillator 2109 and 2111 respectively and the wide gates produced by the switch transistors 2130 and 2131 via emitter followers 2132 and 2105 must be described at this time as to their function and purpose. As long as there is range video presented to the range tracker it is not necessary to utilize the wide gates whose function is to terminate the operation of the bootstrap circuit 2106 at the end of 130 microseconds. This time is equal to about 10 nautical miles, the required maximum range of the system under discussion.

When range video is present from the video amplifier, the wide gates are switched out of the circuit to enable the narrow early and late gates to be utilized. This is one of the prime purposes for the track initiate circuit. The early and late narrow gates are fed from the early and late blocking oscillators to each individual "or" circuit 2133 of the track initiate circuit. These two "or" circuits 2133 (shown as one block) outputs are "anded" together with the range video through the pulse "and" circuit 2134. This allows the range video to ride any place between the early and late gates. The output of the "and" circuit is fed through a common base amplifier 2135 for power gain before it is sent into a three stage stretcher circuit. In the stretcher circuit 2136 the 0.2 microsecond pulse is stretched to 200 microseconds at an amplitude of approximately 4 volts. The output of the stretcher is now sent to the Schmitt trigger circuit 2137. Here the trigger is amplified by power switch 2138 and used to initiate a relay 2142 which switches the narrow gates into the circuit and sends a signal to the DME meter via the range flag output 2139 which operates the tracking flag on the DME meter. In the absence of the early and late gates the circuit will not function and the wide gates will be used to terminate the tracking system at 10 nautical miles which will also cause the tracking flag to drop in the windows of the DME meter.

It will be noted that the analog voltage applied to the horizontal crosspointer meter to give elevation information and the analog voltage applied to the DME meter depicting range can be combined to give height information. The elevation analog voltage derived in accordance with the invention and the range analog voltage (hypotenuse) can be used to obtain height information by simply multiplying these two analogs. This can be simply accomplished by using a sine potentiometer and positioning servo. The range voltage is fed across the resistance element of the sine potentiometer. The elevation analog voltage is fed to a position servo including servo motor and driver amplifier. The motor is coupled to the rotating shaft of the sine potentiometer. The amplitude of the input voltage to the servo amplifier, in this case the elevation analog voltage, determines the amount of rotational movement of the servo motor. This movement, in turn, causes the contact arm of the sine potentiometer to assume a position whereby the voltage derived at the point of contact (sine potentiometer tap) is the product of the sine of elevation analog voltage times the range analog voltage. Therefore, the voltage derived at the contact arm of the sine potentiometer is indicative of the height of the aircraft. This output voltage can then be metered or otherwise visually presented. The index can be calibrated in feet, thus, the height of the aircraft during the approach period can be continuously monitored.

The type of aircraft will determine the installation of the antenna and type of transmission line. The antenna used can be either a helix or a flush mounted type. Antenna location is determined by the type of aircraft. The transmission line can be either waveguide or coaxial cable determined by type and location of equipment in aircraft.

The type of aircraft will determine the type and amount of equipment that can be utilized with the airborne receiver-converter of the present invention. The receiver-converter as described, is capable of supplying information to operate a DME meter, crosspointer indicator, flareout coupler, and automatic pilot control operation. The pilot's control equipment can be a power on-off switch either mounted in a separate panel or on a panel of some associated equipment. This switch is utilized to remotely apply power to the airborne equipment from the pilot's cockpit.

In conclusion, it will be realized that the chief advantage of the present invention in flareout control is the provision of accurate height and/or angle data at low elevation angles by simple means, which are the same means as are employed for guidance of aircraft at long ranges and which means are useful simultaneously by a plurality of aircraft at various distances from the ground equipment.

Various modifications and variations of the circuitry and mechanical configurations falling within the concepts of the present invention will suggest themselves to those skilled in the art, accordingly, it is not intended that the scope of this invention be limited to the implementations shown, the description and drawing being intended to be illustrative only. For example, another embodiment of the invention might employ a superheterodyne receiver in lieu of the crystal-detector-video-amplifier type airborne receiver described heretofore.

What is claimed is:

1. An electronic approach and landing system for aircraft comprising: azimuth and elevation angular scanning ground installed antennas, each for angular scanning of substantially the same solid sector of space, each of said antennas having a null within its respective radiation pattern in the direction of scan; radio frequency generating means; commutating means for supplying energy from said generating means to said antennas alternately; means operatively coupled to said antennas to cause said angular scanning; means separately responsive to the angular scanning position of each of said antennas to generate angle data signals continuously representative of the scanning directions of said antennas; modulating means responsive to said angle data signals for modulating the emission of said radio frequency generating means alternately in synchronism with the azimuth-elevation alternation of said commutating means in accordance with said angle data; airborne receiving means for detecting said azimuth and elevation nulls and to receive and evaluate said modulated emission during the time of occurrence of said nulls, thereby obtaining positional information, air derived from a ground generated reference.

2. In an electronic approach and landing system for aircraft the combination comprising: radio frequency power generating means; at least one ground installed antenna system for angular scanning, said antenna system including two scanning antennas for scanning substantially the same sector of space and each having a null within the radiation pattern in the direction of scan; scanning drive means arranged to cause said antennas to scan reciprocally through said sector of space; means associated with said scanning drive to supply power from said radio frequency power generating means alternately to said antennas, whereby each of said antennas is energized only during its downward scan motion and the beam in space thereby scans only downward with a minimum of lost time between successive scans.

3. The invention set forth in claim 2 also including: means responsive to the angular scanning position of whichever of said antennas is scanning downward at any given time, to generate an angle data signal continuously representative of the scanning direction of said beam in space; modulating means responsive to said angle data signal for modulating the emission of said radio frequency power generating means in accordance with said angle data signal; and airborne receiving means for detecting said null and sampling said modulated emission during the time of occurrence of said null, to generate a signal which is proportional to said angle data signal.

4. In an electronic approach and landing system for aircraft which includes ground and airborne radar transmitting, receiving, and duplexing means, the combination comprising: a ground installed antenna system operatively coupled to said ground radar transmitting and receiving means through said duplexing means for angular scanning of a sector of space, said antenna system having a null within its radiation pattern in the direction of scan; first means responsive to the angular scanning position of said antenna system to generate an angle data signal continuously representative of the scanning direction of said antenna; second means responsive to said angle data signal for modulating the emission of said ground transmitting means in accordance with said angle data signal; airborne third means including an antenna and said airborne receiving and duplexing means for developing an elevation angle signal by evaluating said angle data signal at the time of occurrence of said null; airborne fourth means including said airborne transmitting and duplexing means for generating and transmitting an interrogation signal at a first predetermined time with respect to the time of reception of said angle data signal; ground fifth means including said ground receiving, duplexing, and transmitting means for receiving said interrogation signal and retransmitting a corresponding ranging signal; airborne sixth means including said airborne antenna, receiving, and duplexing means for detecting said ranging signal and establishing a range analog based on the time delay between transmission of said interrogation signal and said ranging signal; and seventh means responsive to both said range analog and said elevation angle signal to generate an air derived position determination.

5. An electronic approach and landing system for aircraft adapted to provide accurate elevation information comprising: directive antenna means at a predetermined ground location for developing a beam pattern in space which is relatively narrow in the elevation plane and which contains a null substantially at the center of said beam pattern; means for causing said antenna means to scan in a substantially vertical direction; pulse modulating means responsive to the angular scanning position of said antenna means for generating pulse groups representative of said angular scanning position; radio frequency generating means responsive to said pulse modulating means to energize said antenna means with pulses of radio frequency energy; airborne receiver means for demodulating said pulses of radio frequency energy; decoding means for converting said demodulated pulses to an electrical analog of said angular scanning position of said antenna means; and means for selecting a value of said analog contemporaneously with the passage of said null past said airborne receiver means, thereby to generate an air derived elevation angle representative of an aircraft with respect to said predetermined ground location.

6. An electronic approach and landing system for aircraft adapted to provide accurate elevation information comprising: directive antenna means at a predetermined ground location for developing a beam pattern in space which is relatively narrow in the elevation plane and which contains a null substantially at the center of said beam pattern; means for causing said antenna means to scan in a substantially vertical direction; pulse modulating means responsive to the angular scanning position of said antenna means for generating pulse groups representative of said angular scanning position; radio frequency generating means responsive to said pulse modulating means to energize said antenna means with pulses of radio frequency energy; airborne receiver means for demodulating said pulses of radio frequency energy; decoding means for converting said demodulated pulses to an electrical analog of said angular scanning position of said antenna means; means for selecting a value of said analog contemporaneously with the passage of said null past said airborne receiver means; airborne range determining means including airborne radar and ground transponder means operating to generate a range signal representative of the distance between said aircraft and said predetermined ground location; and computer means responsive to said electrical analog and said range signal for producing a height representing signal.

7. The invention set forth in claim 6 including additional means calibrated in units of height measurement and responsive to said height representing signal to produce substantially continuous visual presentation of height information in the aircraft during approach and landing.

8. The invention set forth in claim 6 further defined in that said range determining means includes an airborne radar transmitter, a ground receiver, and airborne and ground TR devices whereby said airborne TR device holds said airborne receiver inoperative while said airborne radar transmitter interrogates; said ground receiver is enabled by said ground TR device to receive said interrogations between transmissions of said pulse groups by said radio frequency generating means, said radio frequency generating means retransmits pulses corresponding to said interrogations, and said airborne receiver receives said retransmitted pulses thereby enabling the generation of said range signal representative of the distance between said aircraft and said predetermined ground location.

9. An electronic approach and landing system for aircraft adapted to provide accurate elevation information comprising: directive antenna means at a predetermined ground location for developing a beam pattern in space which is relatively narrow in the elevation plane and which contains a null substantially at the center of said beam pattern; means for causing said antenna means to scan in a substantially vertical direction; pulse modulating means responsive to the angular scanning position of said antenna means for generating pulse groups representative of said angular scanning position; radio frequency generating means responsive to said pulse modulating means to energize said antenna means with pulses of radio frequency energy; airborne receiver means for demodulating said pulses of radio frequency energy; decoding means whereby said demodulated pulses are converted to an electrical analog of said angular scanning position of said antenna means; means for selecting a value of said analog contemporaneously with the passage of said null past said airborne receiver means; airborne range determining means including airborne radar and ground transponder means operating to generate a range signal representative of the distance between said aircraft and said predetermined ground location; and computer means responsive to said electrical analog and said range signal for producing a height representing signal.

10. An electronic approach and landing system for aircraft comprising: at least one ground installed antenna adapted for angular scanning of a sector of space, said antenna having a null within the radiation pattern in the direction of scan; radio frequency generating means connected to energize said antenna; means operatively coupled to said antenna to cause said angular scanning; means responsive to the angular scanning position of said antenna to generate an angle data signal continuously representative of the scanning direction of said antenna; modulating means responsive to said angle data signal for modulating the emission of said radio frequency generating means in accordance with said angle data; airborne receiving means for detecting said null and to receive coded modulation from said modulated emission; and airborne means responsive to said coded modulation and said detected null for sampling the value of said coded modulation during the time of occurrence of said null and generating a corresponding angle representing signal.

11. An electronic approach and landing system for aircraft comprising: a ground installed first antenna adapted for angular scanning of a sector of space, said first antenna having a null within its radiation pattern in the direction of scan; first radio frequency generating means connected to energize said first antenna with continuous radio frequency energy at a first frequency; a ground installed second antenna having a substantially non-directional pattern at least within said sector of space; second radio frequency generating means connected to energize said second antenna means with radio frequency energy at a second frequency; means operatively coupled to said first antenna to cause said angular scanning; means responsive to the angular scanning position of said first antenna to generate an angle data signal continuously representative of the scanning direction of said first antenna; modulating means responsive to said angle data signal for modulating the emission of said second radio frequency generating means in accordance with said angle data; airborne receiving means for detecting said null and to receive coded modulation from said modulated emission; and airborne means responsive to said coded modulation and said detected null for producing a signal representative of the value of said coded modulation during the time of occurrence of said null.

References Cited in the file of this patent
FOREIGN PATENTS
767,354     Germany _____ July 10, 1952